(12) United States Patent
Wei et al.

(10) Patent No.: US 11,877,180 B2
(45) Date of Patent: Jan. 16, 2024

(54) METHODS, WIRELESS COMMUNICATIONS NETWORKS AND INFRASTRUCTURE EQUIPMENT

(71) Applicant: Sony Corporation, Tokyo (JP)

(72) Inventors: Yuxin Wei, Basingstoke (GB); Vivek Sharma, Basingstoke (GB); Hideji Wakabayashi, Basingstoke (GB); Yassin Aden Awad, Basingstoke (GB)

(73) Assignee: SONY CORPORATION, Tokyo (JP)

( * ) Notice: Subject to any disclaimer, the term of this patent is extended or adjusted under 35 U.S.C. 154(b) by 384 days.

(21) Appl. No.: 17/277,737

(22) PCT Filed: Sep. 25, 2019

(86) PCT No.: PCT/EP2019/075912
§ 371 (c)(1),
(2) Date: Mar. 19, 2021

(87) PCT Pub. No.: WO2020/064861
PCT Pub. Date: Apr. 2, 2020

(65) Prior Publication Data
US 2021/0352523 A1    Nov. 11, 2021

(30) Foreign Application Priority Data

Sep. 27, 2018 (EP) .................................. 18197370

(51) Int. Cl.
*H04W 28/02* (2009.01)
*H04W 40/02* (2009.01)
(Continued)

(52) U.S. Cl.
CPC ....... *H04W 28/0289* (2013.01); *H04W 40/02* (2013.01); *H04W 40/34* (2013.01); *H04W 88/04* (2013.01); *H04W 88/06* (2013.01)

(58) Field of Classification Search
None
See application file for complete search history.

(56) References Cited

U.S. PATENT DOCUMENTS

2018/0123683 A1   5/2018  Wakabayashi et al.
2019/0098682 A1*  3/2019  Park .................. H04W 28/0231
(Continued)

FOREIGN PATENT DOCUMENTS

WO     2016/116289 A1    7/2016

OTHER PUBLICATIONS

International Search Report and Written Opinion dated Dec. 4, 2019, received for PCT Application PCT/EP2019/075912 Filed on Sep. 25, 2019, 35 pages.

(Continued)

*Primary Examiner* — Brian S Roberts
(74) *Attorney, Agent, or Firm* — XSENSUS LLP

(57) ABSTRACT

A method of controlling communications within a wireless communications network is provided. The method comprises communicating, with a first infrastructure equipment acting as a donor node, signals representing data by a second of the infrastructure equipment over a first communications path via one or more others of infrastructure equipment acting as relay nodes, the second infrastructure equipment being a child node and one of the one or more other infrastructure equipment acting as the relay nodes or the donor node being a parent node, the parent node being connected to the child node via a backhaul communications link and configured to allocate uplink communications resources to the child node.

19 Claims, 10 Drawing Sheets

(51) Int. Cl.
*H04W 40/34* (2009.01)
*H04W 88/04* (2009.01)
*H04W 88/06* (2009.01)

(56) References Cited

U.S. PATENT DOCUMENTS

| | | | |
|---|---|---|---|
| 2019/0297555 A1* | 9/2019 | Hampel | H04L 47/58 |
| 2019/0372887 A1* | 12/2019 | Majmundar | H04L 45/22 |
| 2019/0394084 A1* | 12/2019 | Tsai | H04W 36/0079 |
| 2020/0053629 A1* | 2/2020 | Majmundar | H04W 36/023 |
| 2020/0092784 A1* | 3/2020 | Hampel | H04W 40/34 |
| 2021/0211928 A1* | 7/2021 | Narasimha | H04W 88/14 |

OTHER PUBLICATIONS

Holma et al., "LTE for UMTS OFDMA and SC-FDMA Based Radio Access", John Wiley and Sons, 2009, pp. 25-27.

Huawei et al., "Revised Work Item Proposal: Enhancements of NB-Iot", 3GPP TSG RAN Meeting #73, RP-161901, Sep. 19 - 22, 2016, 8 pages.

AT&T et al., "New SID Proposal: Study on Integrated Access and Backhaul for NR", 3GPP RAN Meeting #75, RP-170831, Mar. 6-9, 2017, 5 pages.

3GPP, "Study on Integrated Access and Backhaul; (Release 15)", TR 38.874 V0.1.0, Feb. 2018, pp. 1-11.

Qualcomm et al., "Proposals on IAB Architecture", 3GPP TSG-RAN WG2 NR Ad hoc 1801, R2-1801606, Jan. 22-26, 2018, 7 pages.

Qualcomm et al., "Way Forward—IAB Architecture for L2/3 Relaying", 3GPP TSG-RAN WG3 Meeting #99, R3-181944, Apr. 16-20, 2018, 6 pages.

Vivo, "IAB Topology and Routing Management", 3GPP TSG-RAN WG2 Meeting #103, R2-1811778, Aug. 20-24, 2018, 4 pages.

Qualcomm Incorporated et al., "IAB Topology Adaptation for Architecture 1a", 3GPP TSG-RAN WG3 Meeting #101, R3-184693, Aug. 20-24, 2018, 13 pages.

AT&T, "Multi-Connectivity Architecture Design for IAB Arch. 1a", 3GPP TSG-RAN WG3 Meeting #101, R3-184754, Aug. 20-24, 2018, 8 pages.

Tayeb et al., "Dynamic Relaying in 3GPP LTE-Advanced Networks", EURASIP Journal on Wireless Communications and Networking, vol. 2009, No. 1, Jan. 1, 2009, 11 pages.

AT&T, "Route Changes Based on Intra-gNB Handover of IAB Node", 3GPP TSG-RAN WG2 Meeting #103, R2-1812405, Aug. 20-24, 2018, 4 pages.

* cited by examiner

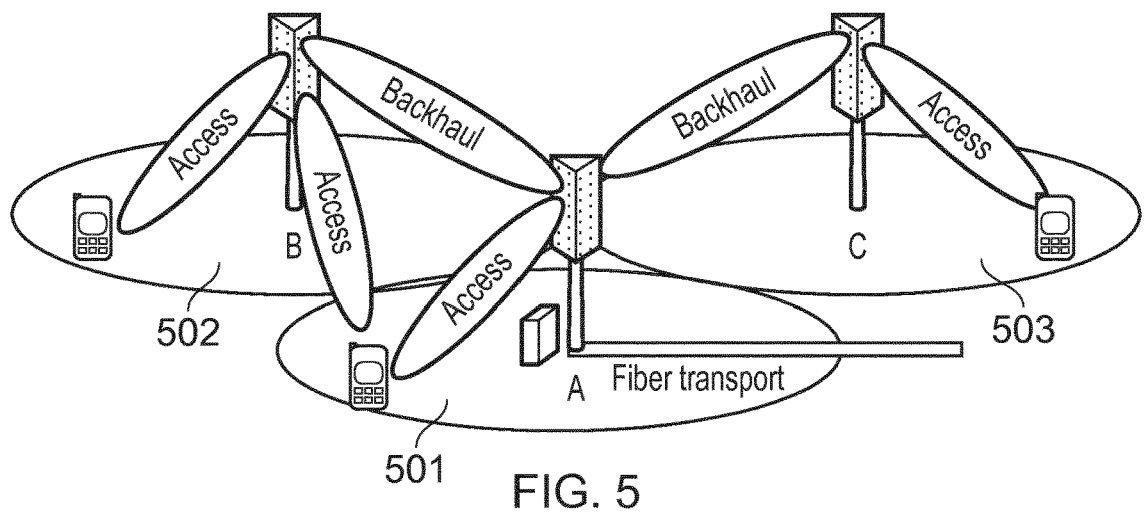
FIG. 5
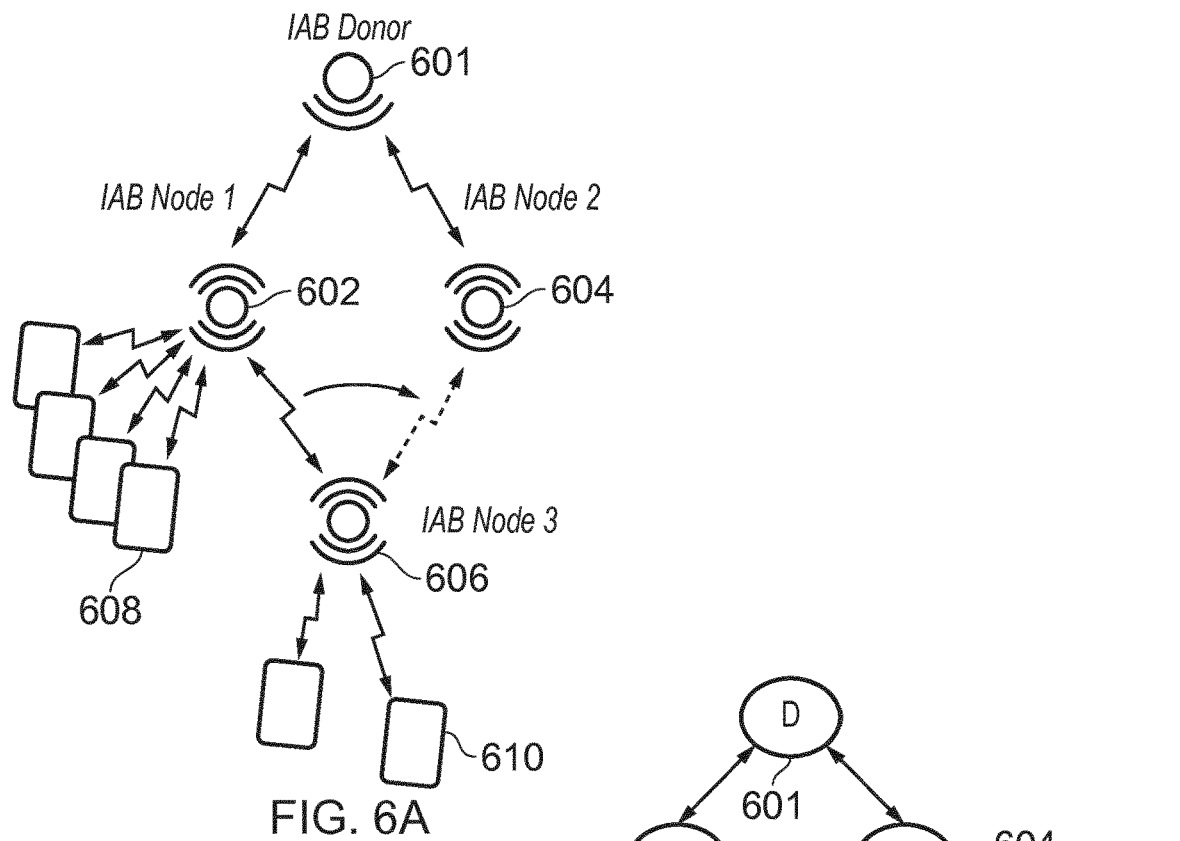
FIG. 6A
FIG. 6B

METHODS, WIRELESS COMMUNICATIONS NETWORKS AND INFRASTRUCTURE EQUIPMENT

CROSS-REFERENCE TO RELATED APPLICATIONS

The present application is based on PCT filing PCT/EP2019/075912, filed Sep. 25, 2019, which claims priority to EP 18197370.2, filed Sep. 27, 2018, the entire contents of each are incorporated herein by reference.

BACKGROUND

Field of Disclosure

The present disclosure relates to methods and apparatus for the communication of signals between various infrastructure equipment, communications devices and the core network on a wireless backhaul communications link in a wireless communications system.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Recent generation mobile telecommunication systems, such as those based on the 3GPP defined UMTS and Long Term Evolution (LTE) architectures, are able to support a wider range of services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. In addition to supporting these kinds of more sophisticated services and devices, it is also proposed for newer generation mobile telecommunication systems to support less complex services and devices which make use of the reliable and wide ranging coverage of newer generation mobile telecommunication systems without necessarily needing to rely on the high data rates available in such systems. The demand to deploy such networks is therefore strong and the coverage area of these networks, i.e. geographic locations where access to the networks is possible, may be expected to increase ever more rapidly.

Future wireless communications networks will therefore be expected to routinely and efficiently support communications with a wider range of devices associated with a wider range of data traffic profiles and types than current systems are optimized to support. For example it is expected future wireless communications networks will be expected to efficiently support communications with devices including reduced complexity devices, machine type communication (MTC) devices, high resolution video displays, virtual reality headsets and so on. Some of these different types of devices may be deployed in very large numbers, for example low complexity devices for supporting the "The Internet of Things", and may typically be associated with the transmissions of relatively small amounts of data with relatively high latency tolerance.

In view of this there is expected to be a desire for future wireless communications networks, for example those which may be referred to as 5G or new radio (NR) system/new radio access technology (RAT) systems, as well as future iterations/releases of existing systems, to efficiently support connectivity for a wide range of devices associated with different applications and different characteristic data traffic profiles.

As radio technologies continue to improve, for example with the development of 5G, the possibility arises for these technologies to be used not only by infrastructure equipment to provide service to wireless communications devices in a cell, but also for interconnecting infrastructure equipment to provide a wireless backhaul. In view of this there is a need to ensure that a donor infrastructure equipment that is physically connected to the core network does not suffer from a "capacity crunch" when a large amount of data is being transmitted from various communications devices and infrastructure equipment to the core network via the donor infrastructure equipment.

SUMMARY OF THE DISCLOSURE

The present disclosure can help address or mitigate at least some of the issues discussed above as defined in the appended claims.

Embodiments of the present technique can provide a method of controlling communications within a wireless communications network. The wireless communications network comprises a plurality of infrastructure equipment each being configured to communicate with one or more others of the infrastructure equipment via a backhaul communications link, one or more of the infrastructure equipment each being configured to communicate with one or more communications devices via an access link. The method comprises communicating, with a first of the infrastructure equipment acting as a donor node connected to a core network part of the wireless communications network, signals representing data by a second of the infrastructure equipment over a first communications path via one or more others of the infrastructure equipment acting as relay nodes, the second infrastructure equipment being a child node and one of the one or more other infrastructure equipment acting as the relay nodes or the donor node being a parent node, the parent node being connected to the child node via a backhaul communications link and configured to allocate uplink communications resources to the child node, determining, by a triggering infrastructure equipment which is one of the child node and the parent node, that a trigger condition for the child node to communicate with the donor node over a second communications path via one or more other of the infrastructure equipment acting as relay nodes is satisfied, the second communications path being different to the first communications path, transmitting, by the triggering infrastructure equipment, a route change command to the other of the child node and the parent node to the triggering infrastructure equipment or when the child node is the triggering infrastructure equipment, transmitting the route change command to one of the infrastructure equipment acting as relay nodes on the second communications path, the route change command indicating that the child node should communicate with the donor node over the second communications path, and communicating, by the child node, with the donor node over the second communications path.

Respective aspects and features of the present disclosure are defined in the appended claims.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein:

FIG. 5 is reproduced from [3], and provides a first example of an Integrated Access and Backhaul (IAB) deployment scenario;

FIG. 6A is reproduced from [5], and provides a second example of an IAB deployment scenario in which there are multiple candidate routes each comprising multiple hops from the end node to the donor node;

FIG. 6B is an extended version of FIG. 6A, providing a third example of an IAB deployment scenario in which there are multiple candidate routes each comprising multiple hops from the end node to the donor node;

DETAILED DESCRIPTION OF THE EMBODIMENTS

Long Term Evolution (LTE) Wireless Communications System

Figure 1:
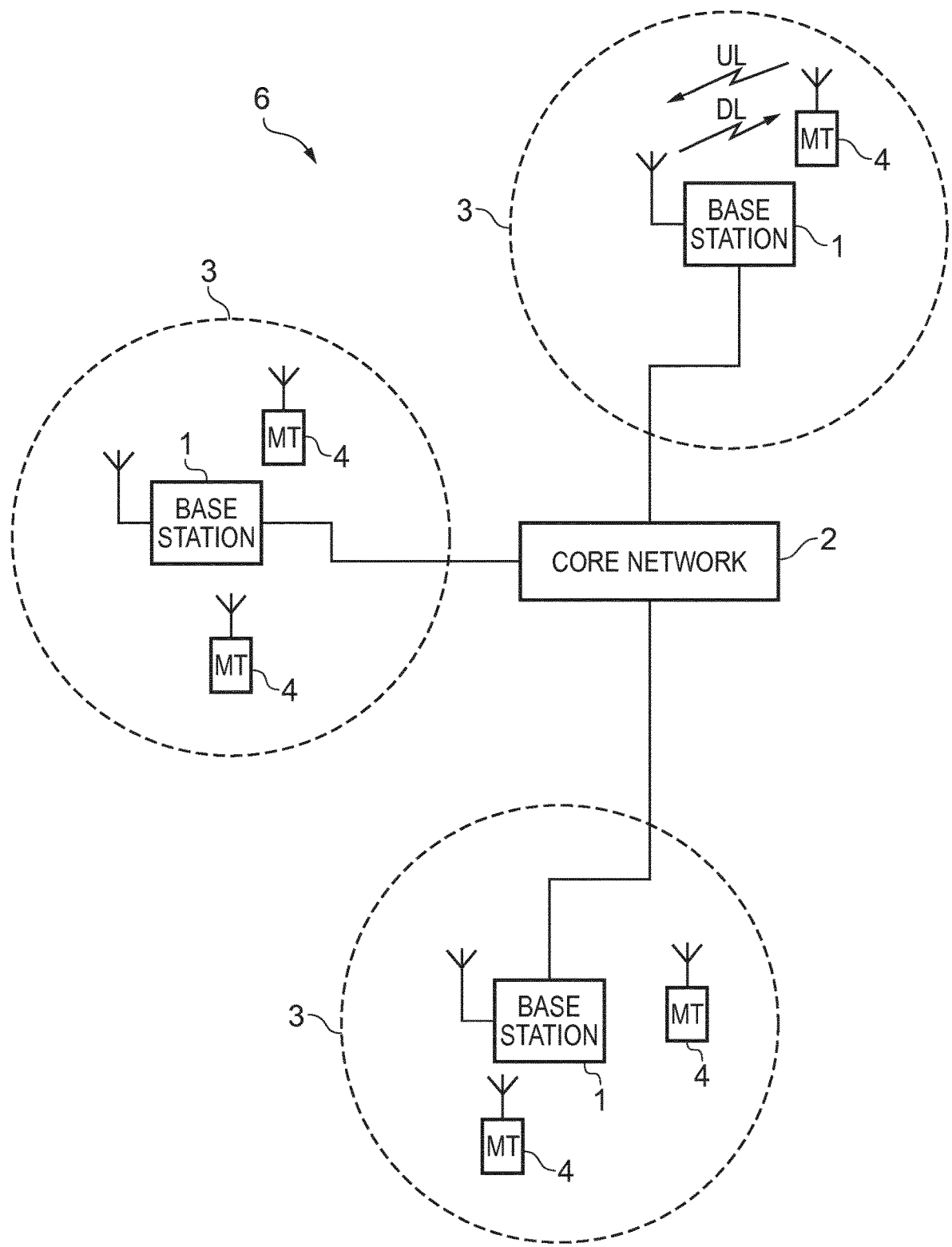
FIG. 1 schematically represents some aspects of a LTE-type wireless telecommunication system which may be configured to operate in accordance with certain embodiments of the present disclosure.

FIG. 1 provides a schematic diagram illustrating some basic functionality of a mobile telecommunications network/system 6 operating generally in accordance with LTE principles, but which may also support other radio access technologies, and which may be adapted to implement embodiments of the disclosure as described herein. Various elements of FIG. 1 and certain aspects of their respective modes of operation are well-known and defined in the relevant standards administered by the 3GPP® body, and also described in many books on the subject, for example, Holma H. and Toskala A [1]. It will be appreciated that operational aspects of the telecommunications networks discussed herein which are not specifically described (for example in relation to specific communication protocols and physical channels for communicating between different elements) may be implemented in accordance with any known techniques, for example according to the relevant standards and known proposed modifications and additions to the relevant standards.

The network 6 includes a plurality of base stations 1 connected to a core network 2. Each base station provides a coverage area 3 (i.e. a cell) within which data can be communicated to and from communications devices 4.

Although each base station 1 is shown in FIG. 1 as a single entity, the skilled person will appreciate that some of the functions of the base station may be carried out by disparate, inter-connected elements, such as antennas (or antennae), remote radio heads, amplifiers, etc. Collectively, one or more base stations may form a radio access network.

Data is transmitted from base stations 1 to communications devices 4 within their respective coverage areas 3 via a radio downlink. Data is transmitted from communications devices 4 to the base stations 1 via a radio uplink. The core network 2 routes data to and from the communications devices 4 via the respective base stations 1 and provides functions such as authentication, mobility management, charging and so on. Terminal devices may also be referred to as mobile stations, user equipment (UE), user terminal, mobile radio, communications device, and so forth.

Services provided by the core network 2 may include connectivity to the internet or to external telephony services. The core network 2 may further track the location of the communications devices 4 so that it can efficiently contact (i.e. page) the communications devices 4 for transmitting downlink data towards the communications devices 4.

Base stations, which are an example of network infrastructure equipment, may also be referred to as transceiver stations, nodeBs, e-nodeBs, eNB, g-nodeBs, gNB and so forth. In this regard different terminology is often associated with different generations of wireless telecommunications systems for elements providing broadly comparable functionality. However, certain embodiments of the disclosure may be equally implemented in different generations of wireless telecommunications systems, and for simplicity certain terminology may be used regardless of the underlying network architecture. That is to say, the use of a specific term in relation to certain example implementations is not intended to indicate these implementations are limited to a certain generation of network that may be most associated with that particular terminology.

New Radio Access Technology (5G) Wireless Communications System

Figure 2:
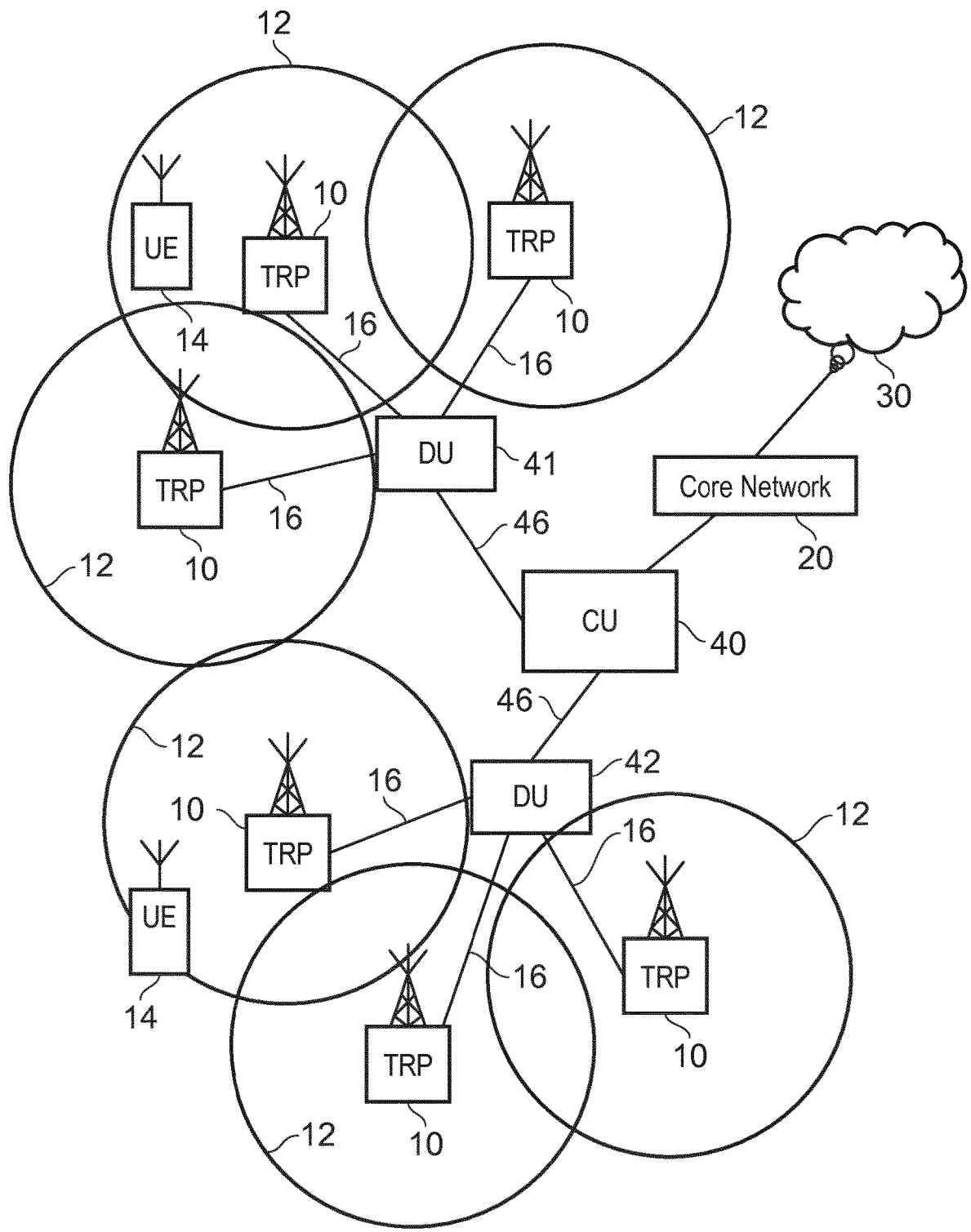
FIG. 2 schematically represents some aspects of a new radio access technology (RAT) wireless communications system which may be configured to operate in accordance with certain embodiments of the present disclosure.

An example configuration of a wireless communications network which uses some of the terminology proposed for NR and 5G is shown in FIG. 2. A 3GPP Study Item (SI) on New Radio Access Technology (NR) has been defined [2]. In FIG. 2 a plurality of transmission and reception points (TRPs) 10 are connected to distributed control units (DUs) 41, 42 by a connection interface represented as a line 16. Each of the TRPs 10 is arranged to transmit and receive signals via a wireless access interface within a radio frequency bandwidth available to the wireless communications network. Thus within a range for performing radio communications via the wireless access interface, each of the TRPs 10, forms a cell of the wireless communications network as represented by a circle 12. As such, wireless communications devices 14 which are within a radio communications range provided by the cells 12 can transmit and receive signals to and from the TRPs 10 via the wireless access interface. Each of the distributed units 41, 42 are connected to a central unit (CU) 40 (which may be referred to as a controlling node) via an interface 46. The central unit 40 is then connected to the a core network 20 which may contain all other functions required to transmit data for communicating to and from the wireless communications devices and the core network 20 may be connected to other networks 30.

The elements of the wireless access network shown in FIG. 2 may operate in a similar way to corresponding elements of an LTE network as described with regard to the example of FIG. 1. It will be appreciated that operational aspects of the telecommunications network represented in FIG. 2, and of other networks discussed herein in accordance with embodiments of the disclosure, which are not specifically described (for example in relation to specific communication protocols and physical channels for communicating between different elements) may be implemented in accordance with any known techniques, for example according to currently used approaches for implementing such operational aspects of wireless telecommunications systems, e.g. in accordance with the relevant standards.

The TRPs 10 of FIG. 2 may in part have a corresponding functionality to a base station or eNodeB of an LTE network. Similarly the communications devices 14 may have a functionality corresponding to the UE devices 4 known for operation with an LTE network. It will be appreciated therefore that operational aspects of a new RAT network (for example in relation to specific communication protocols and physical channels for communicating between different elements) may be different to those known from LTE or other known mobile telecommunications standards. However, it will also be appreciated that each of the core network component, base stations and communications devices of a new RAT network will be functionally similar to, respectively, the core network component, base stations and communications devices of an LTE wireless communications network.

In terms of broad top-level functionality, the core network 20 connected to the new RAT telecommunications system represented in FIG. 2 may be broadly considered to correspond with the core network 2 represented in FIG. 1, and the respective central units 40 and their associated distributed units/TRPs 10 may be broadly considered to provide functionality corresponding to the base stations 1 of FIG. 1. The term network infrastructure equipment/access node may be used to encompass these elements and more conventional base station type elements of wireless telecommunications systems. Depending on the application at hand the responsibility for scheduling transmissions which are scheduled on the radio interface between the respective distributed units and the communications devices may lie with the controlling node/central unit and/or the distributed units/TRPs. A communications device 14 is represented in FIG. 2 within the coverage area of the first communication cell 12. This communications device 14 may thus exchange signaling with the first central unit 40 in the first communication cell 212 via one of the distributed units 10 associated with the first communication cell 12.

It will further be appreciated that FIG. 2 represents merely one example of a proposed architecture for a new RAT based telecommunications system in which approaches in accordance with the principles described herein may be adopted, and the functionality disclosed herein may also be applied in respect of wireless telecommunications systems having different architectures.

Thus certain embodiments of the disclosure as discussed herein may be implemented in wireless telecommunication systems/networks according to various different architectures, such as the example architectures shown in FIGS. 1 and 2. It will thus be appreciated the specific wireless telecommunications architecture in any given implementation is not of primary significance to the principles described herein. In this regard, certain embodiments of the disclosure may be described generally in the context of communications between network infrastructure equipment/access nodes and a communications device, wherein the specific nature of the network infrastructure equipment/access node and the communications device will depend on the network infrastructure for the implementation at hand. For example, in some scenarios the network infrastructure equipment/access node may comprise a base station, such as an LTE-type base station 1 as shown in FIG. 1 which is adapted to provide functionality in accordance with the principles described herein, and in other examples the network infrastructure equipment may comprise a control unit/controlling node 40 and/or a TRP 10 of the kind shown in FIG. 2 which is adapted to provide functionality in accordance with the principles described herein.

Figure 3:
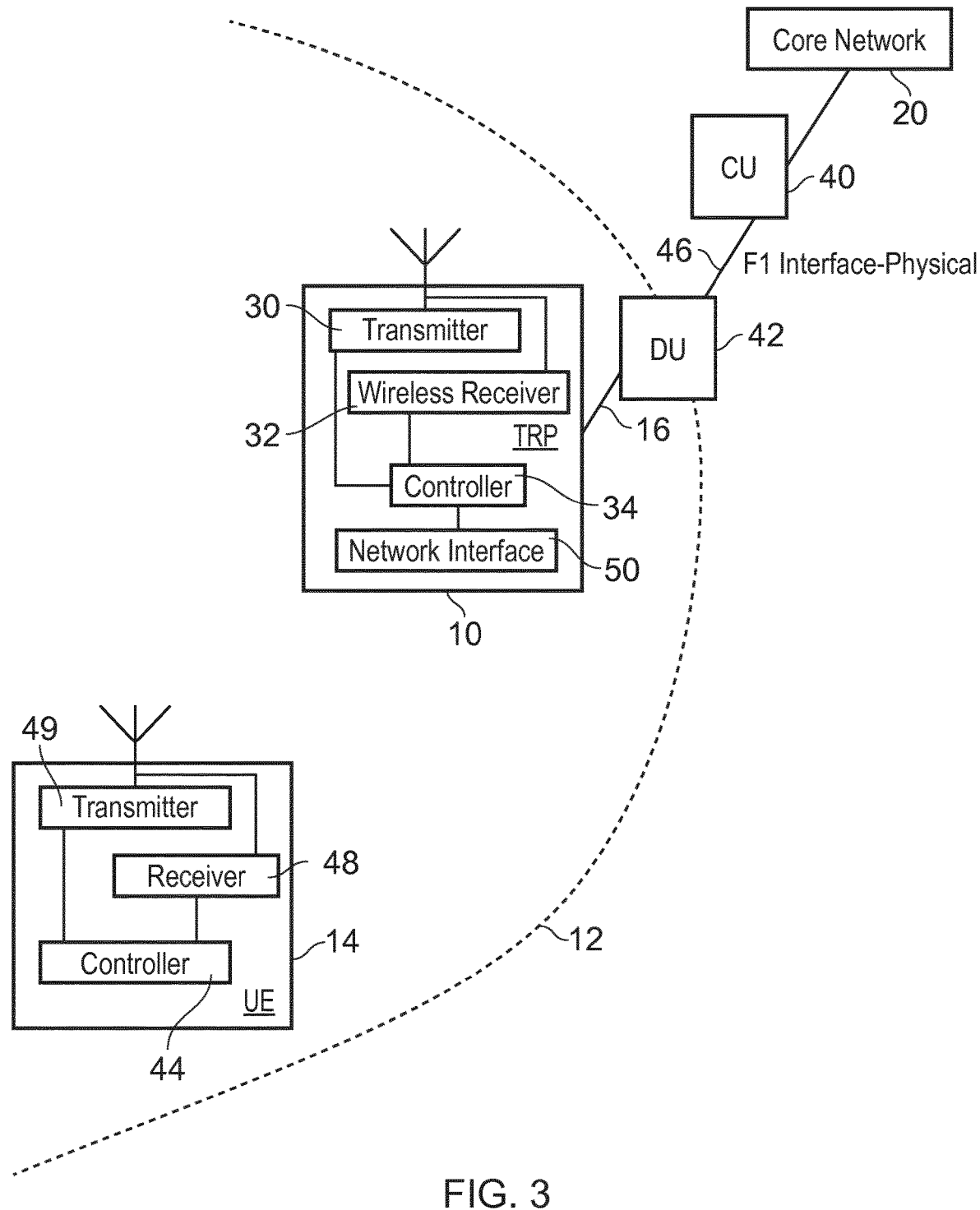
FIG. 3 is a schematic block diagram of some components of the wireless communications system shown in FIG. 2 in more detail in order to illustrate example embodiments of the present technique.

A more detailed diagram of some of the components of the network shown in FIG. 2 is provided by FIG. 3. In FIG. 3, a TRP 10 as shown in FIG. 2 comprises, as a simplified representation, a wireless transmitter 30, a wireless receiver 32 and a controller or controlling processor 34 which may operate to control the transmitter 30 and the wireless receiver 32 to transmit and receive radio signals to one or more UEs 14 within a cell 12 formed by the TRP 10. As shown in FIG. 3, an example UE 14 is shown to include a corresponding transmitter 49, a receiver 48 and a controller 44 which is configured to control the transmitter 49 and the receiver 48 to transmit signals representing uplink data to the wireless communications network via the wireless access interface formed by the TRP 10 and to receive downlink data as signals transmitted by the transmitter 30 and received by the receiver 48 in accordance with the conventional operation.

The transmitters 30, 49 and the receivers 32, 48 (as well as other transmitters, receivers and transceivers described in relation to examples and embodiments of the present disclosure) may include radio frequency filters and amplifiers as well as signal processing components and devices in order to transmit and receive radio signals in accordance for example with the 5G/NR standard. The controllers 34, 44, 48

(as well as other controllers described in relation to examples and embodiments of the present disclosure) may be, for example, a microprocessor, a CPU, or a dedicated chipset, etc., configured to carry out instructions which are stored on a computer readable medium, such as a non-volatile memory. The processing steps described herein may be carried out by, for example, a microprocessor in conjunction with a random access memory, operating according to instructions stored on a computer readable medium.

As shown in FIG. 3, the TRP 10 also includes a network interface 50 which connects to the DU 42 via a physical interface 16. The network interface 50 therefore provides a communication link for data and signaling traffic from the TRP 10 via the DU 42 and the CU 40 to the core network 20.

The interface 46 between the DU 42 and the CU 40 is known as the F1 interface which can be a physical or a logical interface. The F1 interface 46 between CU and DU may operate in accordance with specifications 3GPP TS 38.470 and 3GPP TS 38.473, and may be formed from a fibre optic or other wired high bandwidth connection. In one example the connection 16 from the TRP 10 to the DU 42 is via fibre optic. The connection between a TRP 10 and the core network 20 can be generally referred to as a backhaul, which comprises the interface 16 from the network interface 50 of the TRP 10 to the DU 42 and the F1 interface 46 from the DU 42 to the CU 40.

Figure 4:
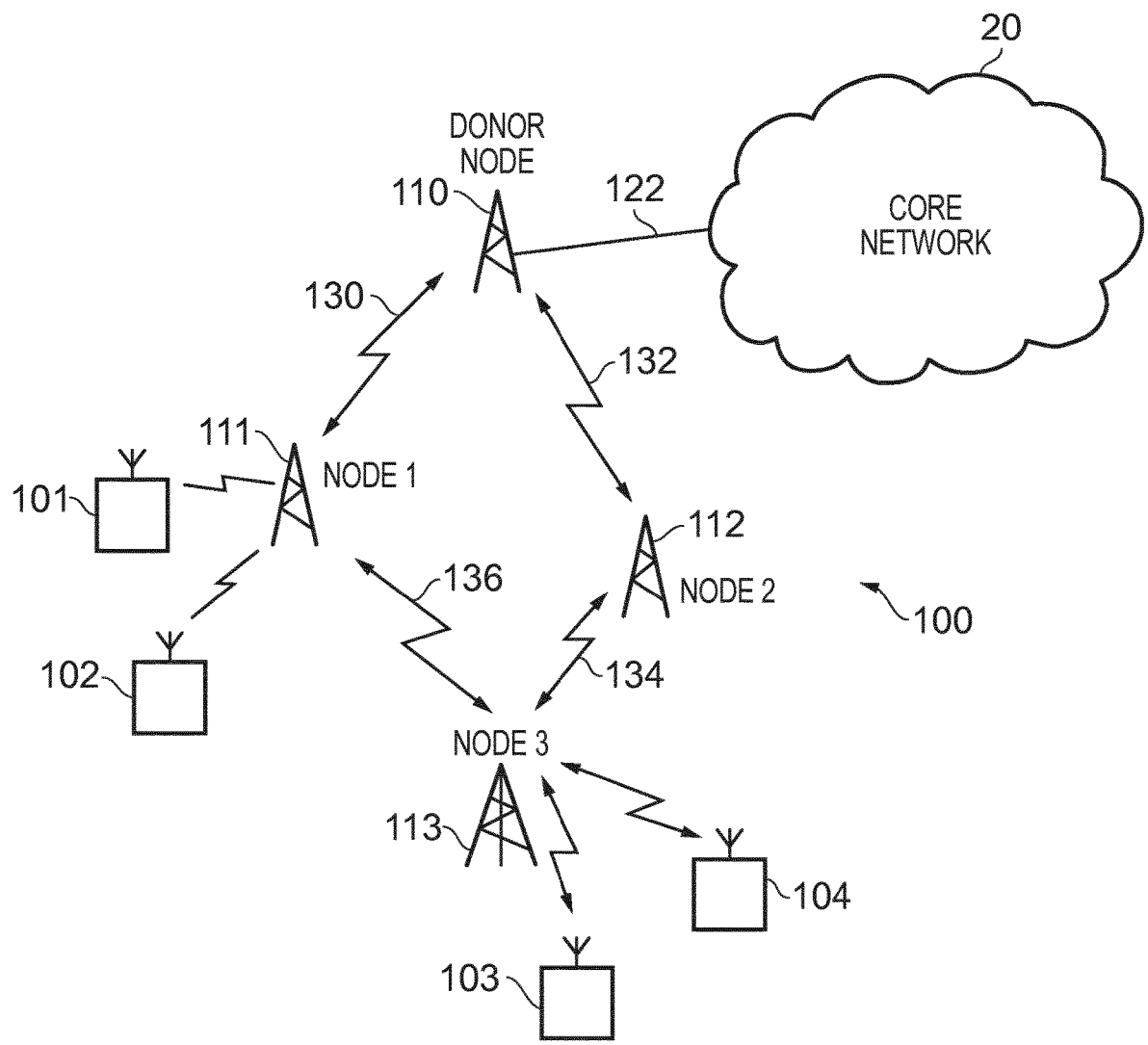
FIG. 4 schematically represents some aspects of an example wireless telecommunication network which may be configured to operate in accordance with certain embodiments of the present disclosure.

Example arrangements of the present technique can be formed from a wireless communications network corresponding to that shown in FIG. 1 or 2, as shown in FIG. 4. FIG. 4 provides an example in which cells of a wireless communications network are formed from infrastructure equipment which are provided with an Integrated Access and Backhaul (IAB) capability. The wireless communications network 100 comprises the core network 20 and a first, a second, a third and a fourth communications device (respectively 101, 102, 103 and 104) which may broadly correspond to the communications devices 4, 14 described above.

The wireless communications network 100 comprises a radio access network, comprising a first infrastructure equipment 110, a second infrastructure equipment 111, a third infrastructure equipment 112, and a fourth infrastructure equipment 113. Each of the infrastructure equipment provides a coverage area (i.e. a cell, not shown in FIG. 4) within which data can be communicated to and from the communications devices 101 to 104. For example, the fourth infrastructure equipment 113 provides a cell in which the third and fourth communications devices 103 and 104 may obtain service. Data is transmitted from the fourth infrastructure equipment 113 to the fourth communications device 104 within its respective coverage area (not shown) via a radio downlink. Data is transmitted from the fourth communications device 104 to the fourth infrastructure equipment 113 via a radio uplink.

The infrastructure equipment 110 to 113 in FIG. 4 may correspond broadly to the TRPs 10 of FIG. 2 and FIG. 3.

The first infrastructure equipment 110 in FIG. 4 is connected to the core network 20 by means of one or a series of physical connections. The first infrastructure equipment 110 may comprise the TRP 10 (having the physical connection 16 to the DU 42) in combination with the DU 42 (having a physical connection to the CU 40 by means of the F1 interface 46) and the CU 40 (being connected by means of a physical connection to the core network 20).

However, there is no direct physical connection between any of the second infrastructure equipment 111, the third infrastructure equipment 112, and the fourth infrastructure equipment 113 and the core network 20. As such, it may be necessary (or, otherwise determined to be appropriate) for data received from a communications device (i.e. uplink data), or data for transmission to a communications device (i.e. downlink data) to be transmitted to or from the core network 20 via other infrastructure equipment (such as the first infrastructure equipment 110) which has a physical connection to the core network 20, even if the communications device is not currently served by the first infrastructure equipment 110 but is, for example, in the case of the wireless communications device 104, served by the fourth infrastructure equipment 113.

The second, third and fourth infrastructure equipment 111 to 113 in FIG. 4 may each comprise a TRP, broadly similar in functionality to the TRPs 10 of FIG. 2.

In some arrangements of the present technique, one or more of the second to fourth infrastructure equipment 111 to 113 in FIG. 4 may further comprise a DU 42, and in some arrangements of the present technique, one or more of the second to fourth infrastructure equipment 110 to 113 may comprise a DU and a CU.

In some arrangements of the present technique, the CU 40 associated with the first infrastructure equipment 110 may perform the function of a CU not only in respect of the first infrastructure equipment 110, but also in respect of one or more of the second, the third and the fourth infrastructure equipment 111 to 113.

In order to provide the transmission of the uplink data or the downlink data between a communications device and the core network, a route is determined by any suitable means, with one end of the route being an infrastructure equipment physically connected to a core network and by which uplink and downlink traffic is routed to or from the core network.

In the following, the term 'node' is used to refer to an entity or infrastructure equipment which forms a part of a route for the transmission of the uplink data or the downlink data.

An infrastructure equipment which is physically connected to the core network and operated in accordance with an example arrangement may provide communications resources to other infrastructure equipment and so is referred to as a 'donor node'. An infrastructure equipment which acts as an intermediate node (i.e. one which forms a part of the route but is not acting as a donor node) is referred to as a 'relay node'. It should be noted that although such intermediate node infrastructure equipment act as relay nodes on the backhaul link, they may also provide service to communications devices. The relay node at the end of the route which is the infrastructure equipment controlling the cell in which the communications device is obtaining service is referred to as an 'end node'.

In the wireless network illustrated in FIG. 4, each of the first to fourth infrastructure equipment 110 to 113 may therefore function as nodes. For example, a route for the transmission of uplink data from the fourth communications device 104 may consist of the fourth infrastructure equipment 113 (acting as the end node), the third infrastructure equipment 112 (acting as a relay node), and the first infrastructure equipment 110 (acting as the donor node). The first infrastructure 110, being connected to the core network 20, transmits the uplink data to the core network 20.

For clarity and conciseness in the following description, the first infrastructure equipment 110 is referred to below as the 'donor node', the second infrastructure equipment 111 is referred to below as 'Node 1', the third infrastructure equipment 112 is referred to below as 'Node 2' and the fourth infrastructure equipment 113 is referred to below as 'Node 3'.

For the purposes of the present disclosure, the term 'upstream node' is used to refer to a node acting as a relay node or a donor node in a route, which is a next hop when used for the transmission of data via that route from a wireless communications device to a core network. Similarly, 'downstream node' is used to refer to a relay node from which uplink data is received for transmission to a core network. For example, if uplink data is transmitted via a route comprising (in order) the Node 3 113, the Node 1 111 and the donor node 110, then the donor node 110 is an upstream node with respect to the Node 1 111, and the Node 3 113 is a downstream node with respect to the Node 1 111.

More than one route may be used for the transmission of the uplink/downlink data from/to a given communications device; this is referred to herein as 'multi-connectivity'. For example, the uplink data transmitted by the wireless communications device 104 may be transmitted either via the Node 3 113 and the Node 2 112 to the donor node 110, or via the Node 3 113 and the Node 1 111 to the donor node 110.

In the following description, example arrangements are described in which each of the nodes is an infrastructure equipment; the present disclosure is not so limited. A node may comprise at least a transmitter, a receiver and a controller. In some arrangements of the present technique, the functionality of a node (other than the donor node) may be carried out by a communications device, which may be the communications device 4 (of FIG. 1) or 14 (of FIG. 2), adapted accordingly. As such, in some arrangements of the present technique, a route may comprise one or more communications devices. In other arrangements, a route may consist of only a plurality of infrastructure equipment.

In some arrangements of the present technique, an infrastructure equipment acting as a node may not provide a wireless access interface for the transmission of data to or by a communications device other than as part of an intermediate transmission along a route.

In some arrangements of the present technique, a route is defined considering a wireless communications device (such as the wireless communications device 104) as the start of a route. In other arrangements a route is considered to start at an infrastructure equipment which provides a wireless access interface for the transmission of the uplink data by a wireless communications device.

Each of the first infrastructure equipment acting as the donor node 110 and the second to fourth infrastructure equipment acting as the Nodes 1-3 111-113 may communicate with one or more other nodes by means of an inter-node wireless communications link, which may also be referred to as a wireless backhaul communications links. For example, FIG. 4 illustrates four inter-node wireless communications links 130, 132, 134, 136.

Each of the inter-node wireless communications links 130, 132, 134, 136 may be provided by means of a respective wireless access interface. Alternatively, two or more of the inter-node wireless communications links 130, 132, 134, 136 may be provided by means of a common wireless access interface and in particular, in some arrangements of the present technique, all of the inter-node wireless communications links 130, 132, 134, 136 are provided by a shared wireless access interface.

A wireless access interface which provides an inter-node wireless communications link may also be used for communications between an infrastructure equipment (which may be a node) and a communications device which is served by the infrastructure equipment. For example, the fourth wireless communications device 104 may communicate with the infrastructure equipment Node 3 113 using the wireless access interface which provides the inter-node wireless communications link 134 connecting the Node 3 113 and the Node 2 112.

The wireless access interface(s) providing the inter-node wireless communications links 130, 132, 134, 136 may operate according to any appropriate specifications and techniques. In some arrangements of the present technique, a wireless access interface used for the transmission of data from one node to another uses a first technique and a wireless access interface used for the transmission of data between an infrastructure equipment acting as a node and a communications device may use a second technique different from the first. In some arrangements of the present technique, the wireless access interface(s) used for the transmission of data from one node to another and the wireless access interface(s) used for the transmission of data between an infrastructure equipment and a communications device use the same technique.

Examples of wireless access interface standards include the third generation partnership project (3GPP)-specified GPRS/EDGE ("2G"), WCDMA (UMTS) and related standards such as HSPA and HSPA+ ("3G"), LTE and related standards including LTE-A ("4G"), and NR ("5G"). Techniques that may be used to provide a wireless access interface include one or more of TDMA, FDMA, OFDMA, SC-FDMA, CDMA. Duplexing (i.e. the transmission over a wireless link in two directions) may be by means of frequency division duplexing (FDD) or time division duplexing (TDD) or a combination of both.

In some arrangements of the present technique, two or more of the inter-node wireless communications links 130, 132, 134, 136 may share communications resources. This may be because two or more of the inter-node wireless communications links 130, 132, 134, 136 are provided by means of a single wireless access interface or because two or more of the inter-node wireless communications links 130, 132, 134, 136 nevertheless operate simultaneously using a common range of frequencies.

The nature of the inter-node wireless communications links 130, 132, 134, 136 may depend on the architecture by which the wireless backhaul functionality is achieved.

Integrated Access and Backhaul (IAB) for NR

A new study item on Integrated Access and Backhaul for NR [3] has been approved. Several requirements and aspects for the integrated access and wireless backhaul for NR to address are discussed in [3], which include:

Efficient and flexible operation for both inband and outband relaying in indoor and outdoor scenarios;
Multi-hop and redundant connectivity;
End-to-end route selection and optimization;
Support of backhaul links with high spectral efficiency;
Support of legacy NR UEs.

The stated objective of the study detailed in [3] is to identify and evaluate potential solutions for topology management for single-hop/multi-hop and redundant connectivity, route selection and optimization, dynamic resource allocation between the backhaul and access links, and achieving high spectral efficiency while also supporting reliable transmission.

FIG. 5 shows the scenario presented in [3], where a backhaul link is provided from cell site A 501 to cells B 502 and C 504 over the air. It is assumed that cells B 502 and C 504 have no wired backhaul connectivity. Considering the CU/DU split architecture in NR as described above, it can be assumed that all of cells A 501, B 502 and C 504 have a dedicated DU unit and are controlled by the same CU.

Several architecture requirements for IAB are laid out in [4]. These include the support for multiple backhaul hops, that topology adaptation for physically fixed relays shall be supported to enable robust operation, minimization of impact to core network specifications, consideration of impact to core networking signaling load, and Release 15 NR specifications should be reused as much as possible in the design of the backhaul link, with enhancements considered.

FIG. 6A is reproduced from [5], and shows an example of a wireless communications system comprising a plurality of IAB-enabled nodes, which may for example be TRPs forming part of an NR network. These comprise an IAB donor node 601 which has a connection to the core network, two IAB nodes (a first IAB node 602 and a second IAB node 604) which have backhaul connections to the IAB donor node 601, and a third IAB node 606 (or end IAB node) which has a backhaul connection to each of the first IAB node 602 and the second IAB node 604. Each of the first IAB node 601 and third IAB node 606 have wireless access connections to UEs 608 and 610 respectively. As shown in FIG. 6A, originally the third IAB node 606 may communicate with the IAB donor node 601 via the first IAB node 602. After the second IAB node 604 emerges, there are now two candidate routes from the third IAB node 606 to the IAB donor node 601; via the first IAB node 602 and via the new second IAB node 604. The new candidate route via the second IAB node 604 will play an important role when there is a blockage in the first IAB node 602 to IAB donor node 604 link. Hence, knowing how to manage the candidate routes efficiently and effectively is important to ensure timely data transmission between relay nodes, especially when considering the characteristics of wireless links.

In the case that the link between the first IAB node 602 and the third IAB node 606 is deteriorating, or the first IAB node 602 becomes overloaded, one of the nodes in the system (this could be the donor node 601 or the first IAB node 602 itself) will need to make a decision to change the route from the third IAB node 606 to the IAB donor node 601 from that via the first IAB node 602 to that via the second IAB node 604.

In FIG. 6A, only the IAB Donor gNB 601 has a fixed line backhaul into the core network. It should be assumed in this case that the traffic from all the UEs 610 within the third IAB node's 606 coverage is backhauled firstly to the first IAB node 602. This backhaul link must compete for capacity on the component carrier serving the first IAB Node 602 with all the UEs 608 within the coverage area of the first IAB Node 602. In the relevant art, the first IAB Node 602 in such a system as that of FIG. 6A is called a "hop"—it relays communications between the end (third) IAB node 606 and the donor IAB node 601. The backhaul link to the first IAB Node 602 requires enough capacity to support the traffic from all the UEs 610, bearing in mind that some of these may have stringent quality of service (QoS) requirements that translate into high traffic intensities.

FIG. 6B is an extended version of FIG. 6A, and shows what happens when there are multiple layers of IAB nodes in the deployment scenario. In the example of FIG. 6A, the third IAB node 606 is the child node of the first IAB node 602, and the first IAB node 602 may be the parent node of the third IAB node 606. However, a parent node may not necessarily be the next node up (i.e. one hop in the uplink direction) towards the IAB donor node 601. A parent node may be more than one hop away from its child node or children nodes, and is in a general sense configured to allocate uplink communications resources to the child node. For example, the donor IAB node 601 may in fact be the parent node of the third IAB node 606. This is shown with greater clarity in FIG. 6B.

In FIG. 6B, in addition to IAB node 601, 602, 604 and 606 as shown in FIG. 6A, there are additional IAB nodes 612 and 614 at the same layer or level of the network as IAB node 606. Below these are IAB nodes 616, 618, 620 and 622, which are now end nodes, in that they have no downlink backhaul connections to other IAB nodes. Here, it could be that the first IAB node 602 is still the parent of the third IAB node 606, but may also be the parent of IAB node 612. Further, the first IAB node 602 may be the parent of IAB nodes 616, 618 and 620 too, or may be a grandparent node to these nodes if nodes 606 and 612 are their parents.

Various architectures have been proposed in order to provide the IAB functionality. The below described embodiments of the present technique are not restricted to a particular architecture. However, a number of candidate architectures which have been considered in, for example, 3GPP document [6] are described below.

Figure 7:
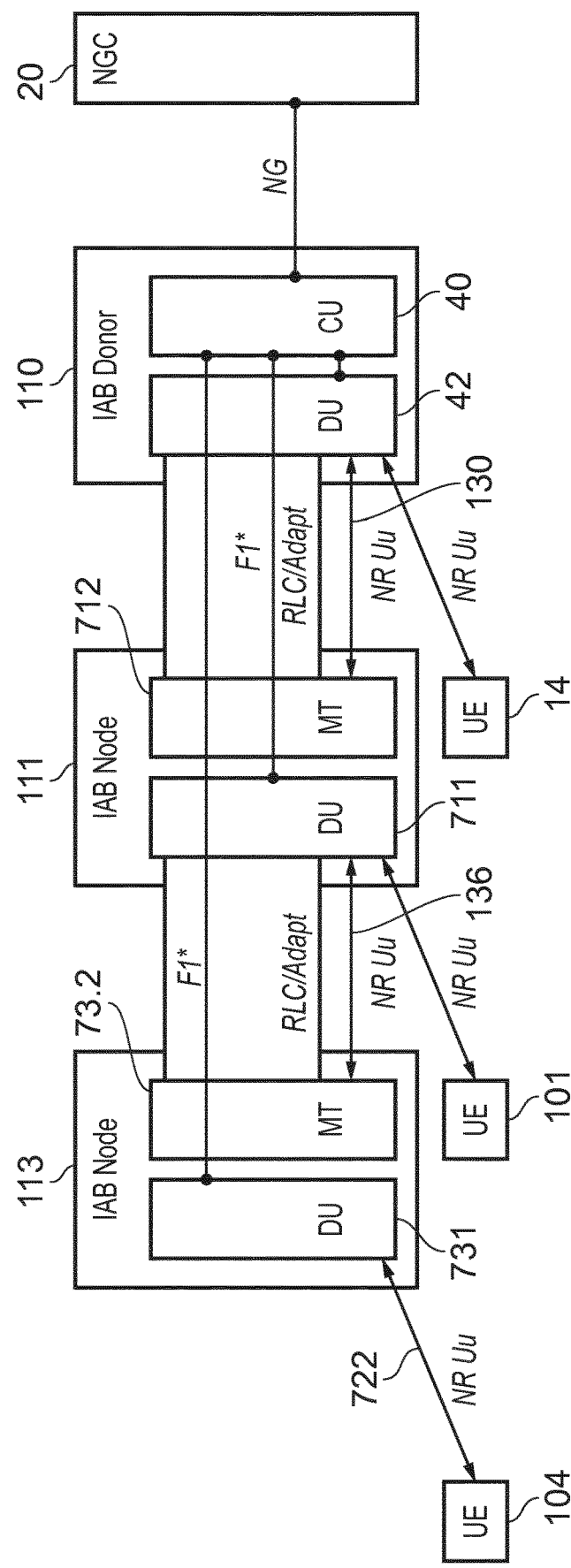
FIG. 7 is a block diagram illustrating a first possible network architecture for providing a wireless backhaul by means of IAB in a wireless telecommunication network which may be configured to operate in accordance with certain embodiments of the present disclosure.

FIG. 7 illustrates one possible architecture, sometimes referred to as "Architecture 1*a*", by which the donor Node 110, the Node 1 111 and the Node 3 113 may provide a wireless backhaul to provide connectivity for the UEs 104, 101, 14.

In FIG. 7, each of the infrastructure equipment acting as an IAB nodes 111, 113 and the donor node 110, includes a distributed unit (DU) 42, 711, 731 which communicates with the UEs 14, 101, 104 and (in the case of the DUs 42, 511 associated with the donor node 110 and the Node 1 111) with the respective downstream IAB nodes 111, 113. Each of the IAB nodes 111, 113 (not including the donor node 110) includes a mobile terminal (MT) 712, 732, which includes a transmitter and receiver (not shown) for transmitting and receiving data to and from the DU of an upstream IAB node and an associated controller (not shown). The inter-node wireless communications links 130, 136 may be in the form of new radio (NR) "Uu" wireless interface. The mobile terminals 712, 732 may have substantially the same functionality as a UE, at least at the access stratum (AS) layer. Notably, however, an MT may not have an associated subscriber identity module (SIM) application; a UE may be conventionally considered to be the combination of an MT and a SIM application.

The Uu wireless interfaces used by IAB nodes to communicate with each other may also be used by UEs to transmit and receive data to and from the DU of the upstream IAB node. For example, the Uu interface 720 which is used by the Node 1 111 for communication with the donor node 110 may also be used by the UE 14 to transmit and receive data to and from the donor node 110.

Similarly, an end node (such as the Node 3 113) may provide a Uu wireless interface 722 for the fourth UE 104 to communicate with the DU 731 of the Node 3 113.

Figure 8:
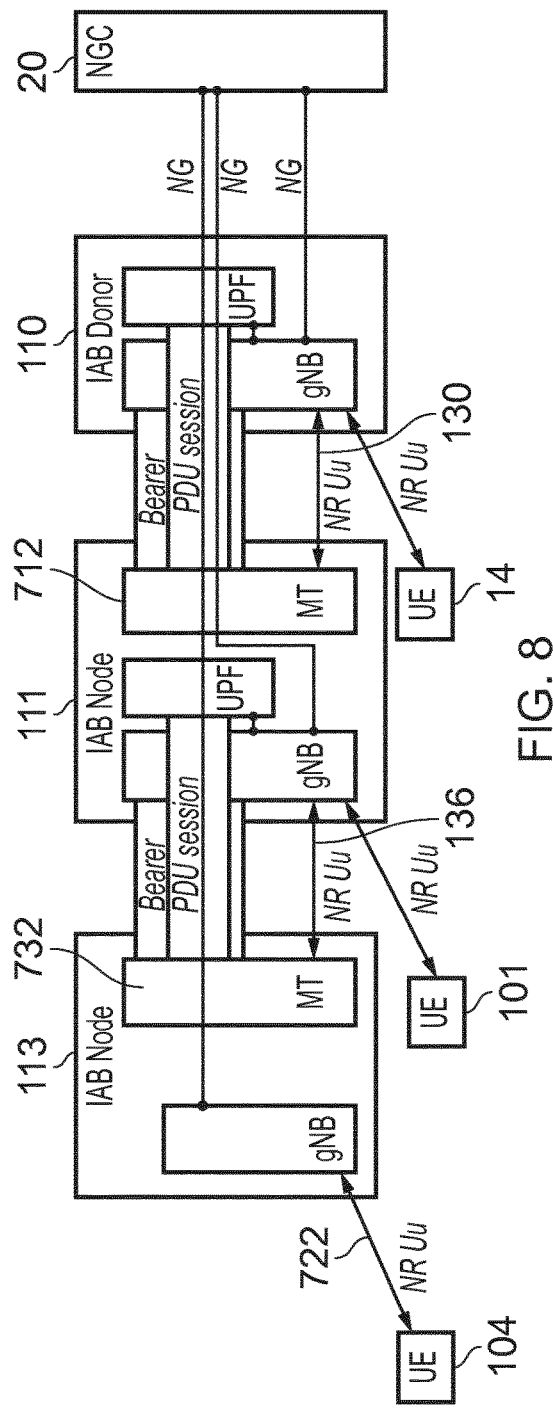
FIG. 8 is a block diagram illustrating a second possible network architecture for providing a wireless backhaul by means of IAB in a wireless telecommunication network which may be configured to operate in accordance with certain embodiments of the present disclosure.
Figure 9:
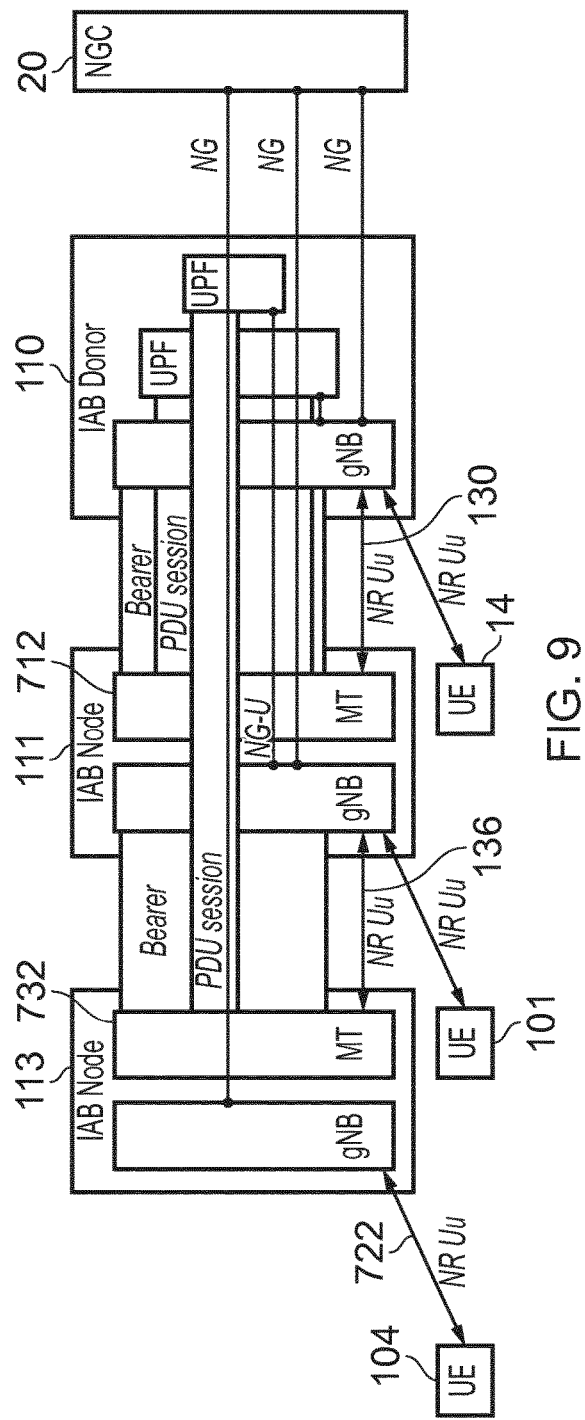
FIG. 9 is a block diagram illustrating a third possible network architecture for providing a wireless backhaul by means of IAB in a wireless telecommunication network which may be configured to operate in accordance with certain embodiments of the present disclosure.

Alternative candidate architectures for the provision of IAB are provided in FIG. 8 and FIG. 9, sometimes referred to as "Architectures 2*a* and 2*b*" respectively. In both FIG. 8 and FIG. 9, each IAB node includes a gNB function, providing a wireless access interface for the use of downstream IAB nodes and wireless communications devices.

FIG. 9 differs from FIG. 7 in that, in FIG. 7, PDU sessions are connected end-on-end to form the wireless backhaul; in FIG. 9, PDU sessions are encapsulated so that each IAB node may establish an end-to-end PDU session which terminates at the IAB donor node 110.

Given the vulnerable characteristics of wireless links, and considering multi-hops on the backhaul link, topology adaptation should be considered in the case that blockages or congestion occur in the backhaul link considering a given hop. It is therefore imperative to maximize the spectral efficiency of the backhaul link in order to maximize its capacity. Embodiments of the present technique seek to address the route change procedure; i.e. how, following a decision on a route change procedure, to carry out the route change procedure, hence enabling an efficient topology management.

There are many challenges to overcome and aspects to consider when providing such route change procedure solutions. Firstly, it must be determined how problems with routes are detected and how measurement reports and/or assistance information may be used to decide when routes should be changed with respect to the intermediate nodes. Such problems may include link quality deterioration of the route as a whole or at one or more of the nodes on the route, traffic loads at one or more of the nodes on the route, or capacity issues or a node status at one or more of the nodes on the route, such as a buffer status or a power headroom status. Secondly, the way in which route selection criteria and decision making must be determined. This includes the route selection meeting any QoS requirements, the securing of capacity, reserving of resources, admission control requirements and means by which the route can be adapted or simplified. Thirdly, it must be determined how the selected links or updated routes are indicated to the relevant nodes in the system. For example, an indication of a route change may be provided to all or a part of intermediate nodes on both the old route and the new route.

As described above with respect to FIGS. 7 to 9, different IAB architectures are proposed. Depending on the architecture, the route reselection and change may require different procedures (i.e. message flows). As described above with relation to FIGS. 6A and 6B, one of the nodes in a system will need to make a decision to change a route between two nodes when the link between these nodes is deteriorating, or one of the nodes becomes overloaded. Embodiments of the present technique seek to provide solutions to how the signaling to realize this procedure may be designed.

Fast Route Change Procedure in IAB

Figure 10:
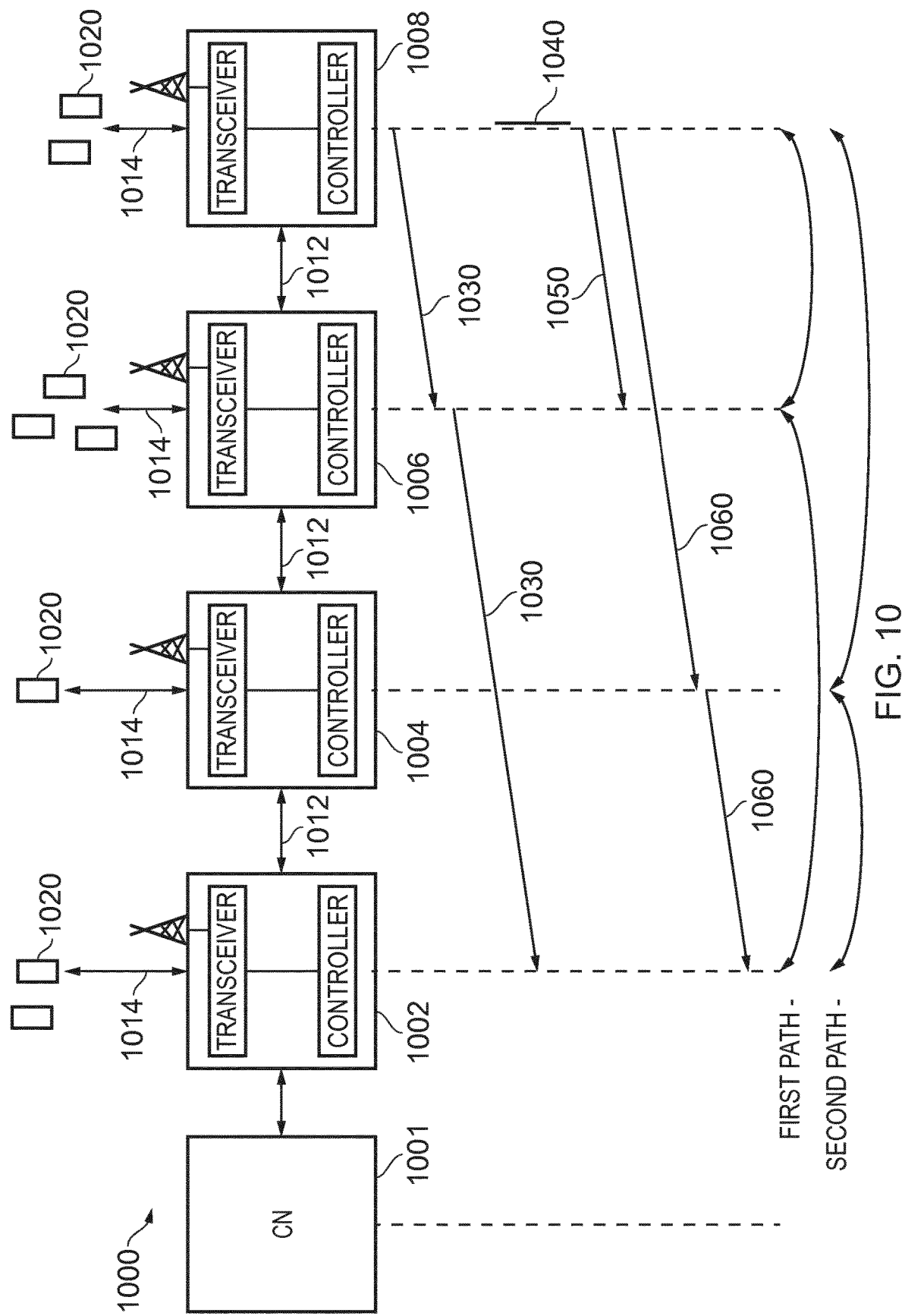
FIG. 10 shows a part schematic, part message flow diagram of communications in a wireless communications system in accordance with embodiments of the present technique.

FIG. 10 shows a part schematic, part message flow diagram of communications in a wireless communications network 1000 in accordance with embodiments of the present technique. The wireless communications network 1000 comprises a plurality of infrastructure equipment 1002, 1004, 1006, 1008 each being configured to communicate with one or more others of the infrastructure equipment 1002, 1004, 1006, 1008 via a backhaul communications link 1012, one or more of the infrastructure equipment 1002, 1004, 1006, 1008 each being configured to communicate with one or more communications devices 1020 via an access link 1014. A second of the infrastructure equipment 1008 comprises transceiver circuitry 1008*a* and controller circuitry 1008*b* which are configured in combination to communicate 1030, with a first of the infrastructure equipment 1002 acting as a donor node connected to a core network 1001 part of the wireless communications network 1000, signals representing data over a first communications path via one or more others of the infrastructure equipment 1006 acting as relay nodes, the second infrastructure equipment 1008 being a child node and one of the one or more other infrastructure equipment 1006 acting as the relay nodes or the donor node being a parent node, the parent node 1006 being connected to the child node 1008 via a backhaul communications link and configured to allocate uplink communications resources to the child node 1008, and a triggering infrastructure equipment which is one of the child 1008 node and the parent node 1006 is configured to determine 1040 that a trigger condition for the child node 1008 to communicate with the donor node 1002 over a second communications path via one or more other of the infrastructure equipment 1004 acting as relay nodes (this may either be instead of or in addition to the first communications path) is satisfied, the second communications path being different to the first communications path, and to transmit 1050 a route change command to the other of the child node 1008 and the parent node 1006 to the triggering infrastructure equipment (or when the child node is the triggering infrastructure equipment, it may transmit the route change command to a target parent node which is one of the infrastructure equipment acting as relay nodes on the second communications path), the route change command indicating that the child node 1008 should communicate with the donor node 1002 over the second communications path (this may be either instead of or in addition to the first communications path), and the child node 1008 is configured to communicate 1060 with the donor node 1002 over the second communications path. The example of FIG. 10 shows the triggering node as being the child node 1008, but this could alternatively be the parent node 1006.

Layer 2 Based Route Change/Reselection

The trigger of the route change, for example referring to the example of FIG. 6A (though equally applicable to the example of FIG. 6B among others), the route may change from the third IAB node 606—the first IAB node 602—the IAB donor node 601 to the third IAB node 606—the second IAB node 604—the IAB donor node 601, could be from a link degradation, or a node blockage etc. So, the data transfer needs to change from the first IAB node 602 to the second IAB node 604. In relation to the example wireless communications network 1000 of FIG. 10, the IAB donor node 601 is equivalent to the first infrastructure equipment 1002, the first IAB node 602 (i.e. the parent node) is equivalent to the infrastructure equipment acting as the relay node 1006, the second IAB node 604 is equivalent to the infrastructure equipment acting as the relay node 1004, and the third IAB node 606 (i.e. the child node) is equivalent to the second infrastructure equipment 1008. Each node (and/or central node) will maintain a candidate route table to include all the candidate routes to or from the donor node. The route change can be triggered by either the child node or by its parent node.

In arrangements of embodiments of the present technique where the route change is triggered by the child node, the child node may need to change its parent node due to one or more of a number of factors. These include, but are not limited to:

The trigger of the route change may be one of a number of factors, such as:

The link quality is getting worse (determined through the measurements of received reference signals, from the parent node or elsewhere);

The link cannot guarantee the QoS requirement (for example delay requirement, which may be determined through reception of a broadcast or dedicated transmission from the parent node);

The parent relay node is overloaded (determined through reception of a broadcast or dedicated transmission from the parent node);

The route selection criterion is changed, for example to minimize the hop count so as to maximize network capacity (determined through notification from an upstream node, for example); or There is an uplink overflow (for example, the child node determines that it has more data to send than has resources allocated in the uplink grant, or no more uplink grant is being allocated).

In other words, the determining that the trigger condition is satisfied comprises a determination, based on measurements performed by the triggering infrastructure equipment on received reference symbols, that a link quality between two of the infrastructure equipment on the first communications path is below a threshold link quality. Here, the two of the infrastructure equipment may be the child node and the parent node; although the two of the infrastructure equipment may equally be the parent node and its own upstream parent node, or may be two nodes other to the child node and the parent node. Alternatively, the determining that the trigger condition is satisfied comprises a determination that at least one quality of service requirement cannot be guaranteed by the parent node. Here, when the triggering infrastructure equipment is the child node, the determination is made by the child node based on the reception of one of a broadcast from the parent node and a dedicated transmission from the parent node to the child node. Alternatively, the determining that the trigger condition is satisfied comprises a determination that at least one quality of service requirement cannot be guaranteed by the parent node. Here, again, when the triggering infrastructure equipment is the child node, the determination is made by the child node based on the reception of one of a broadcast from the parent node and a dedicated transmission from the parent node to the child node. Alternatively, the determining that the trigger condition is satisfied comprises a determination that the child node has more data to transmit to the parent node than can be transmitted in communications resources allocated to the child node for transmitting signals to the parent node. Here, as is described above, when the triggering infrastructure equipment is the parent node, the determination is made by the parent node based on a buffer status report received from the child node.

Once such a trigger condition has been satisfied, the child node will look through its local route table and select one (or more) candidate parent node(s). It is assumed that in order to be added as a configured route, the corresponding destination (i.e. new parent) node will perform admission control first. After that, the child node will issue Layer 2 (L2) signaling, which may for example be a Medium Access Control (MAC) Control Element (CE) to its source parent node to notify its route change. In other words, the route change command is transmitted by the triggering infrastructure equipment in a Medium Access Control, MAC, control element.

The MAC CE could be a newly defined MAC CE to indicate a route change. In other words, in some arrangements, the MAC control element is specific to and associated only with the transmission of the route change command.

Such a MAC CE may also additionally include:
The recommended target cell ID;
An identifier to indicate whether the route change is to add a route or to handover to a new route; and/or
Route change cause: link quality, load etc.
In other words, the MAC control element may comprise an indication of a cell identifier associated with one of the infrastructure equipment acting as relay nodes of the second communications path, the one of the infrastructure equipment acting as relay nodes of the second communications path being a target parent node for the child node. The MAC control element may comprise an identifier which indicates whether the child node should communicate with the donor node over the second communications path instead of the first communications path or communicate with the donor node over both of the first communications path and the second communications path. The MAC control element may comprise an indication of why the triggering infrastructure equipment determined that the trigger condition was satisfied.

In arrangements of embodiments of the present technique where the route change is triggered by the parent node, the parent node may need to signal to its child node to change parent node and thus communications path/route due to one or more of a number of factors. Similarly (and indeed correspondingly) to the example above in which the child node is the triggering infrastructure equipment, these include, but are not limited to:

The link quality is getting worse (an uplink quality determined through the measurements of received reference signals, from the child node or elsewhere);

The link cannot guarantee the QoS requirement (for example delay requirement, which may be determined through reception of a broadcast or dedicated transmission from the parent node);

The parent relay node is overloaded or getting blocked;

The route selection criterion is changed, for example to minimize the hop count so as to maximize network capacity (determined through notification from an upstream node, for example); or There is an uplink overflow (for example, the parent node determines, through a buffer status report (BRS) from the child node that the child node has more data to send than the parent node has allocated it resources in the uplink grant, or the parent node knows no more uplink grant will be allocated).

Once such a trigger condition has been satisfied, the parent node will issue a L2 signaling, which may for example be a MAC CE, to its child node.

As above, where the child node triggers the route change, the MAC CE could be a newly defined MAC CE to indicate a route change, and such a MAC CE may also additionally include:

The recommended target cell ID;
An identifier to indicate whether the route change is to add a route or to handover to a new route; and/or
Route change cause: link quality, load etc.

After receiving this route change command from the parent node, the child node will look through its local route table and select one (or more) candidate parent node(s). As above, it is assumed that in order to be added as a configured route, the corresponding destination (i.e. new parent) node will perform admission control first.

In another arrangement of embodiments of the present technique, and taking the example network shown in FIG. 6A, the third IAB node 606 may only have a single radio-frequency (RF) chain transceiver, and the link status between the first IAB node 602 and the third IAB node 606 is fine. However, the first IAB node 602 may be encountering difficulties—for example the link quality between IAB node 602 and IAB Donor 601 may be getting worse, or an upstream node may be overloaded—in the transmission of data to its parent node, which may for example be the IAB donor node 601. In this case, only the original parent node (i.e. the IAB donor node 601) can be relied upon to send the MAC CE to its child node to switch the link, as from the point of view of the third IAB node 606 there is no need to trigger a route change. It should be noted here that if the third IAB node 606 has multiple RF chains and can communicate (monitor) simultaneously with the first IAB node 602 and the second IAB node 604, the second IAB node 604 can also indicate the third IAB node 606 to switch the link.

In terms of the behaviour of the various IAB nodes in the network after the issue/reception of a route change command, the IAB child node first performs random access to the target parent node. The IAB child node also sends route update information to the IAB donor node to add a new route and/or delete an old route. Depending on whether or not the target node is connected to the core network through the same IAB donor node or not, the signaling between various IAB donor nodes may be included. For the unused route;

(1) The IAB donor node will issue a context release command to the source IAB parent node, and this source IAB parent node will then release its RRC connection with the corresponding child IAB node, or (2) The route will be deactivated, but the RRC connection with the source IAB parent node will be kept. If the link issue is solved, the child node can reactivate the route afterwards.

As an alternative arrangement to the above-described arrangements, the route change command can be sent to the target parent node from the child node (when the child node is the triggering infrastructure equipment) instead of the child node sending the route change command to its source parent node. The child node can:

(1) Send a scheduling request to the target parent node and be allocated a UL grant. After that, the child node can transmit a route change command within this UL grant, (2) If the child node has pre-allocated UL resources (e.g. gets configured grants via an RRC reconfiguration message during attachment to the source parent node or the donor node), the child node can issue the route change command using these reserved resources, (3) The child node will perform a random access (RACH) procedure with a reserved preamble to indicate it is for a route change command, and this child node will be allocated a UL grant within either a 4-step RACH or 2-step RACH response message.

The child node can then directly send data packets to the target parent node afterwards.

Dual Connection/Duplicate Transmission and Selection Combining

Dual connection (also termed duplicate transmission) is a further arrangement of embodiments of the present technique in which a route change could be triggered by the parent node. Such an arrangement uses an additional header to support dual connection/duplicate transmission. The assumption of this arrangement is the link quality between a parent node and an intermediate IAB node between it and its child node may be not good enough. The channel quality is unstable and the good link is quickly changed. By contrast, the link quality between a child node and the intermediate IAB node is good enough. In such a case, any retransmission is likely to occur between the parent node and the intermediate IAB node rather than between the child node and the intermediate IAB node. It is not easy for a child node to know which intermediate IAB node(s) have the better link with its parent node because a child node cannot measure link quality with channel reciprocity.

Such a dual connection arrangement may introduce a new L2 header for retransmission control, but may be reuse the existing MAC level HARQ/RLC level ARQ. The behaviour of the nodes in the network for the dual correction arrangement is as follows:

Preparation/configuration:
The parent node measures the each link quality between an intermediate IAB node and itself;
If the link quality is unstable, the parent node makes a decision on dual connection and duplicate transmission;
The parent node configures the dual connection/duplicate transmission to the child node via another intermediate IAB node.
The intermediate IAB node may reserve the resources of uplink transmission, especially useful for low latency traffic;

Data transmission to IAB nodes:
Assumption:
This example assumes that there is one child node and two intermediate IAB nodes between it and the parent node (such as the example shown in FIG. 6A where the IAB donor node 601 is the parent of the third IAB node 606), but can be extended to more than two IAB nodes;
The child node may insert additional header in L2 such as sequence number (SN), process number (PN) for one-shot data and so on. The child node may also additionally indicate in the L2 header, while transmitting the new data, if old data should be kept or not and if the receiving window should be moved or not in the receiving entity even if a NACK has been received. In other words, the signals representing the data transmitted by the child node to the intermediate infrastructure equipment on each of the first route and the second route may comprise an indication whether one or more data packets previously transmitted by the child node should be discarded, wherein when the indication indicates that the data packets previously transmitted by the child node should be discarded, the intermediate infrastructure equipment is configured to determine that one or more of the data packets that should be discarded have a sequence number falling within a predetermined range, and to adjust a receiving window at the intermediate infrastructure equipment, the receiving window indicating a range of sequence numbers which are expected to be received, so that the receiving window no longer indicates the sequence numbers of the one or more data packets that should be discarded;
The intermediate IAB node can distinguish between the conventional single transmission and dual connection/duplicate transmission based on the additional header;
The child node sends the data to both intermediate IAB nodes:
The child node separately and at different times (i.e. with no overlapping) sends the data to each intermediate IAB node if resources are not reserved or IAB nodes are not synchronized (i.e. the child node is aware that there is a risk of transmission conflict) and then the child node separately receives an ACK/NACK from each of the intermediate IAB nodes if, for example, RLC ARQ is run hop by hop. If the child node receives a NACK from the intermediate IAB nodes, the child node retransmits the data to intermediate IAB nodes. If one node has sent an ACK but the other has sent a NACK for the same sequence number (SN) then the child node, while transmitting the new data towards the node which has sent the NACK, shall indicate to move the receiving window because the relevant PDU was successfully received from the other leg (i.e. the node which sent the ACK). If such an indication is not sent, then the receiving window will stall and result in declaring radio link failure (RLF) and the purpose of duplication (i.e. increasing efficiency by minimizing the chance of and delays caused by RLF) is not achieved. This scheme works for the case where, for example, RLC ARQ runs hop by hop;

The child node sends single data to both of the intermediate IAB nodes in a single transmission if resources are reserved or IAB nodes are synchronized, as the child node does not have reason to think that there may be a risk of transmission conflict. The child node may (or may not) receive an ACK/NACK from the intermediate IAB nodes. If both intermediate IAB nodes send a NACK, the child node retransmits the data. If one node sent a NACK, then the above-described mechanism to ensure stalling of the receiving window is required.

IAB receives the data:
Success:
  If the intermediate IAB node has successfully received the data from the child node, the intermediate IAB node sends the data on to the parent node;
  The intermediate IAB node waits for an ACK/NACK from the parent node and retransmits it if it receives a NACK. This approach assumes that RLC ARQ is run hop by hop. If RLC ARQ runs end-to-end, then no action is required in the intermediate node;
Failure:
  If the intermediate IAB node fails to receive the data, the intermediate IAB node keeps quiet (i.e. stays in a discontinuous transmission, i.e. DTX mode), however stalling of the RLC window needs to be addressed;
  Or the intermediate IAB node may explicitly send an indication that a NACK occurred to the parent node;
  Or the intermediate IAB node may explicitly send an indication that no data has been received to the parent node (maybe here a reuse of a BSR is enough);
Header:
  The intermediate IAB node may add information to the L2 header such as a relay identifier;
  The RLC header is modified to indicate if receiving window should be moved or not;

The parent node's behaviour after receiving the data includes:
ACK/NACK:
  If the parent node successfully receives the data from one of the intermediate IAB nodes, the parent node sends an ACK. This ACK could be end-to-end or hop by hop;
  If the parent node receives the data from neither of the intermediate IAB nodes, the parent node sends a NACK to the intermediate IAB node which it things should be sending the data (this implies that the parent node may not send a NACK to the DTX/no data nodes). This NACK could be end-to-end or hop by hop;
  Optionally, the parent node may directly send an ACK/NACK to the child node (with coverage improvement techniques like power boosting/repetition of ACK/NACK);
Combining method:
  The parent node may use selection combining, which means the parent node select the result based on block error check (CRC OK);
  The parent node may Log-likelihood ratio (LLR) combining, which means the parent node inputs the same data from different node to the decoder for error correction. This method may result in a higher gain than selection combining;
  The parent node may use network coding, which means the parent node may receive the data from one or more than one IAB node(s) and that from the child node, and thus its decoder makes use of both original data and relayed data;
Others:
  The parent node may utilize reordering of data based on allocated sequence numbers;
  The parent node may recover the missing data using RLC layer retransmissions;
  The parent node may stop the dual connection/duplicate transmission and roll back to single route if it finds a stable link. (Here, MAC CE signaling or PHY signaling could be used instead of RRC signaling for quick start/stop of dual connection mode).

In other words, in this arrangement of embodiments of the present technique, the parent node is configured to determine that the child node should enter a dual connection mode in which the child node communicates with the parent node via a first route and a second route, each of the first route and the second route comprising at least one intermediate infrastructure equipment, and to transmit an indication to the child node that the child node should enter the dual connection mode. Here, the parent mode may be configured to perform measurements on signals received from each of one or more infrastructure equipment with which the parent node is connected to via a backhaul communications link to measure a relative link quality between the parent node and the each of the one or more infrastructure equipment with which the parent node is connected to via a backhaul communications link, and the determining that the child node should enter a dual connection mode is based on determining that at least one of the measured link qualities is below a threshold link quality. The child node may then be configured to determine whether there is a risk of a conflict between signals transmitted to the intermediate infrastructure equipment on the first route and signals transmitted to the intermediate infrastructure equipment on the second route. If there is a risk, the child node may be configured to transmit the signals representing the data for the parent node to the intermediate infrastructure equipment on each of the first route and the second route separately and at different times. Alternatively, if there is no risk, the child node may be configured to transmit the signals representing the data for the parent node to the intermediate infrastructure equipment on each of the first route and the second route simultaneously. The parent node may receive data from both intermediate IAB nodes through both the first and second routes. Here, the parent node (or indeed the donor node) may be configured to perform a selection combining procedure at the parent node on signals received from the child node via the intermediate infrastructure equipment on each of the first route and the second route, the selection combining procedure comprising, for each signal transmitted by the child node, selecting between the signals received via the intermediate infrastructure equipment on each of the first route and the second route dependent on which has a highest signal-to-noise ratio. Alternatively, the parent node may be configured to perform a Logarithmic Likelihood Ratio, LLR, combining procedure at the parent node on signals received from the child node via the intermediate infrastructure equipment on each of the first route and the second route, the LLR combining procedure comprising, for each signal transmitted by the child node, combining the signals received via the intermediate infrastructure equipment on each of the first route and the second route to produce a single combined signal.

This arrangement of embodiments of the present technique allows for some advantages, including:
- the provision of a reliable and high QoS (error rate, low latency); and
- the saving of resources and avoidance of inefficient retransmissions.

Dual F1-U Configuration

Figure 11:
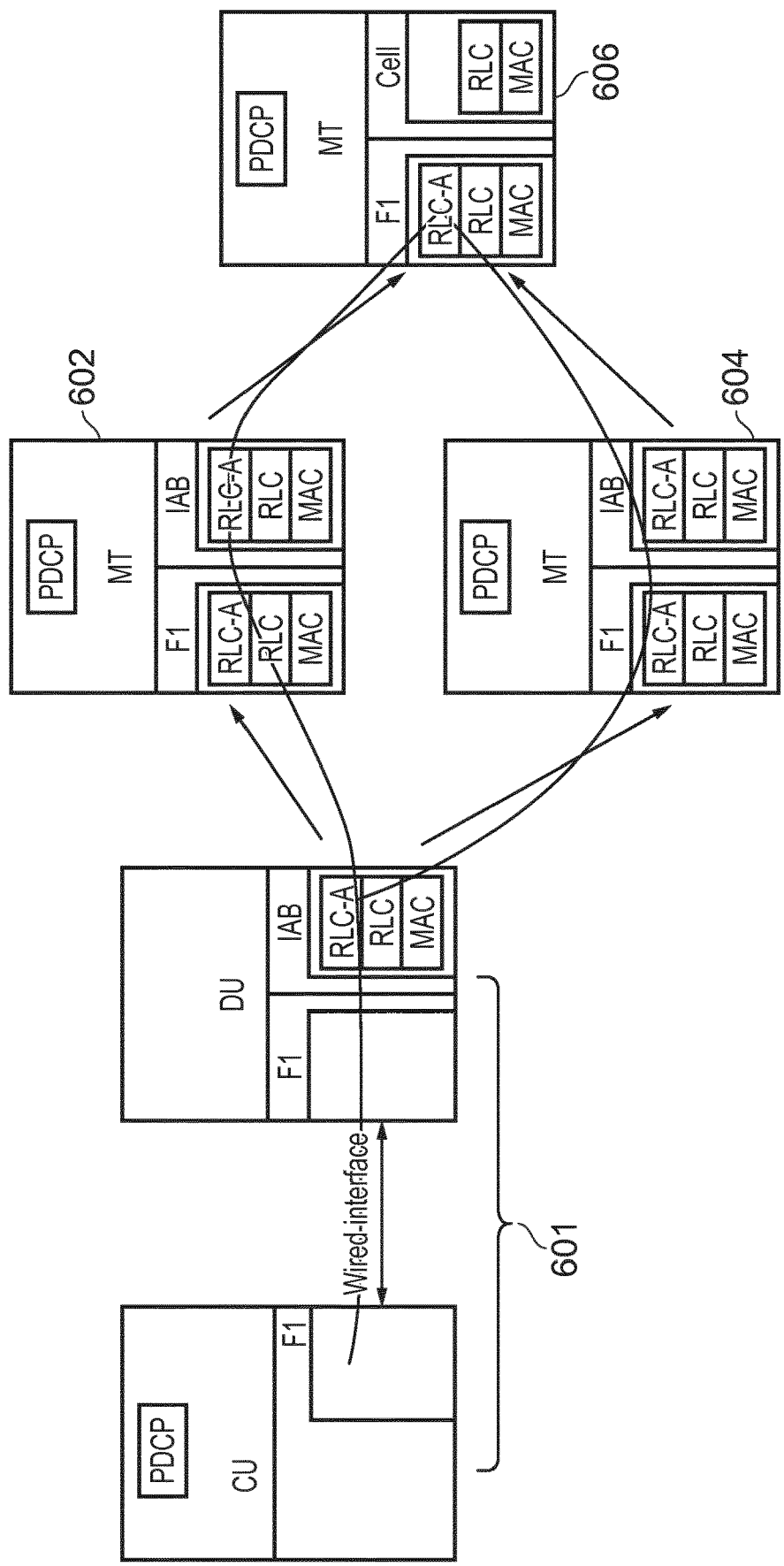
FIG. 11 is a block diagram illustrating an example of a dual F1-U configuration in accordance with embodiments of the present technique.

At least for IAB networks in accordance with architecture group 1, such as is shown in FIG. 7, packet duplication can be realized by configuring multiple end-to-end F1-Us. Such an arrangement is shown in FIG. 11. FIG. 11 corresponds broadly to FIG. 6A, illustrating a more in-depth schematic block diagram of the arrangement of the IAB donor node 601, first IAB node 602, second IAB node 604 and third IAB node 606.

In order to support the third (child) IAB node 606 using packet duplication in order to, for example, enhance the reliability, the IAB donor node 601 can configure multiple F1-Us (the user-plane interface between gNodeBs) on the third IAB node 606. Such F1-Us run over RLC channels on the wireless backhaul between the MT on the third IAB node 606 and DU on the IAB donor node 601. F1-U transport may be physically realized by the hop-by-hop forwarding from the third IAB node 606 to the IAB donor node 601. In other words, a third infrastructure equipment may be configured to transmit signals representing data to the donor node, the third infrastructure equipment being an end node configured to communicate with others of the infrastructure equipment via the backhaul link only on the uplink, wherein the signals representing data may be transmitted from the end node to the donor node via one or more of a plurality of end-to-end routes, each of the end-to-end routes comprising one or more intermediate infrastructure equipment. Here, each of the plurality of end-to-end routes is formed by a continuous end-to-end F1 user-plane interface connection which connects the donor node to the end node via the one or more intermediate infrastructure equipment. The third infrastructure equipment (end node) here may be the same node as the second infrastructure equipment (child node) or may be a different node in the network.

Therefore, with multiple F1-U configurations, the third IAB node 606 is able to choose different routes to send duplicate data packets. It should be noted that it is still up to the end node (in this example the third IAB node 606) to select which routes should be used to send data packets. At the IAB donor node 601, an adaption layer (on top of the RLC layer or below the RLC layer) in the IAB donor node 601 DU may need to be additionally configured in order to deal with the duplicate data discard. In other words, the end node may be configured to transmit duplicate data packets to the donor node via more than one of the end-to-end routes, and the donor node may be configured to determine which of the duplicate data packets should be retained and which of the duplicate data packets should be discarded.

L1 Based Route Change/Reselection

In some of the above described embodiments of the present disclosure, physical layer signaling can be exploited in order to support fast route change. For example, a DCI (on a PDCCH) from the source/target parent node may be sent to the child node to indicate a route change. Here, one or more bits could be added to the DCI to indicate a route change/route addition. After receiving this indication, the child node will look through its local route table to select a target IAB parent node or activate the link to/from the node which sent this activation indication. In other words, the route change command is transmitted by the triggering infrastructure equipment using physical layer signaling.

Flow Chart Representation

Figure 12:
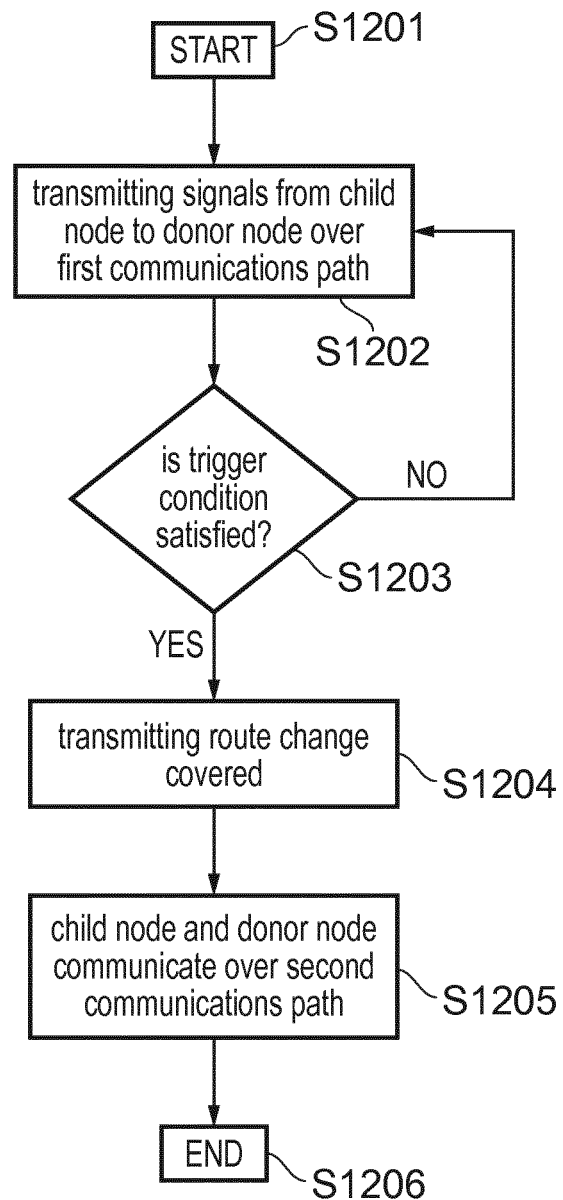
FIG. 12 shows a flow diagram illustrating a process of communications in a communications system in accordance with embodiments of the present technique.

FIG. 12 shows a flow diagram illustrating a process of communications in a communications system in accordance with embodiments of the present technique. The process shown by FIG. 12 is a method of controlling communications within a wireless communications network comprising a plurality of infrastructure equipment each being configured to communicate with one or more others of the infrastructure equipment via a backhaul communications link, one or more of the infrastructure equipment each being configured to communicate with one or more communications devices via an access link.

The method begins in step S1201. The method comprises, in step S1202, communicating, with a first of the infrastructure equipment acting as a donor node connected to a core network part of the wireless communications network, signals representing data by a second of the infrastructure equipment over a first communications path via one or more others of the infrastructure equipment acting as relay nodes, the second infrastructure equipment being a child node and one of the one or more other infrastructure equipment acting as the relay nodes being a parent node, the parent node being connected to the child node via a backhaul communications link and configured to allocate uplink communications resources to the child node. In step S1203, the method comprises determining, by a triggering infrastructure equipment which is one of the child node and the parent node, that a trigger condition for the child node to communicate with the donor node over a second communications path via one or more other of the infrastructure equipment acting as relay nodes is satisfied, the second communications path being different to the first communications path. If not, then the method moves back to step S1202, and the child node continues transmitting the signals to the donor node over the first communications path. However, if the trigger condition is satisfied, then the method advances to step S1204. In step S1204, the process comprises transmitting, by the triggering infrastructure equipment, a route change command to the other of the child node and the parent node to the triggering infrastructure equipment or when the child node is the triggering infrastructure equipment, transmitting the route change command to one of the infrastructure equipment acting as relay nodes on the second communications path, the route change command indicating that the child node should communicate with the donor node over the second communications path. The method then moves to step S1205, which comprises communicating, by the child node, with the donor node over the second communications path. The process ends in step S1206.

Those skilled in the art would appreciate that the method shown by FIG. 12 may be adapted in accordance with embodiments of the present technique. For example, other intermediate steps may be included in the method, or the steps may be performed in any logical order.

Though embodiments of the present technique have been described largely by way of the example system shown in FIG. 10, it would be clear to those skilled in the art that they could be equally applied to other systems, where for example there may be many more nodes or paths to choose from, or more hops between the donor and end nodes.

Those skilled in the art would also appreciate that such infrastructure equipment and/or wireless communications networks as herein defined may be further defined in accordance with the various arrangements and embodiments discussed in the preceding paragraphs. It would be further appreciated by those skilled in the art that such infrastructure equipment and wireless communications networks as herein defined and described may form part of communications systems other than those defined by the present invention.

The following numbered paragraphs provide further example aspects and features of the present technique:

Paragraph 1. A method of controlling communications within a wireless communications network comprising a plurality of infrastructure equipment each being configured to communicate with one or more others of the infrastructure equipment via a backhaul communications link, one or more of the infrastructure equipment each being configured to communicate with one or more communications devices via an access link, the method comprising communicating, with a first of the infrastructure equipment acting as a donor node connected to a core network part of the wireless communications network, signals representing data by a second of the infrastructure equipment over a first communications path via one or more others of the infrastructure equipment acting as relay nodes, the second infrastructure equipment being a child node and one of the one or more other infrastructure equipment acting as the relay nodes or the donor node being a parent node, the parent node being connected to the child node via a backhaul communications link and configured to allocate uplink communications resources to the child node, determining, by a triggering infrastructure equipment which is one of the child node and the parent node, that a trigger condition for the child node to communicate with the donor node over a second communications path via one or more other of the infrastructure equipment acting as relay nodes is satisfied, the second communications path being different to the first communications path, transmitting, by the triggering infrastructure equipment, a route change command to the other of the child node and the parent node to the triggering infrastructure equipment or when the child node is the triggering infrastructure equipment, transmitting the route change command to one of the infrastructure equipment acting as relay nodes on the second communications path, the route change command indicating that the child node should communicate with the donor node over the second communications path, and communicating, by the child node, with the donor node over the second communications path.

Paragraph 2. A method according to Paragraph 1, wherein the determining that the trigger condition is satisfied comprises a determination, based on measurements performed by the triggering infrastructure equipment on received reference symbols, that a link quality between two of the infrastructure equipment on the first communications path is below a threshold link quality.

Paragraph 3. A method according to Paragraph 2, wherein the two of the infrastructure equipment are the child node and the parent node.

Paragraph 4. A method according to any of Paragraphs 1 to 3, wherein the determining that the trigger condition is satisfied comprises a determination that at least one quality of service requirement cannot be guaranteed by the parent node.

Paragraph 5. A method according to any of Paragraphs 1 to 4, wherein the determining that the trigger condition is satisfied comprises a determination that a load at the parent node is above a threshold load.

Paragraph 6. A method according to Paragraph 4 or Paragraph 5, wherein when the triggering infrastructure equipment is the child node, the determination is made by the child node based on the reception of one of a broadcast from the parent node and a dedicated transmission from the parent node to the child node.

Paragraph 7. A method according to any of Paragraphs 1 to 6, wherein the determining that the trigger condition is satisfied comprises a determination that the child node has more data to transmit to the parent node than can be transmitted in communications resources allocated to the child node for transmitting signals to the parent node.

Paragraph 8. A method according to Paragraph 7, wherein when the triggering infrastructure equipment is the parent node, the determination is made by the parent node based on a buffer status report received from the child node.

Paragraph 9. A method according to any of Paragraphs 1 to 8, wherein the route change command is transmitted by the triggering infrastructure equipment in a Medium Access Control, MAC, control element.

Paragraph 10. A method according to Paragraph 9, wherein the MAC control element is specific to and associated only with the transmission of the route change command.

Paragraph 11. A method according to Paragraph 9 or Paragraph 10, wherein the MAC control element comprises an indication of a cell identifier associated with one of the infrastructure equipment acting as relay nodes of the second communications path, the one of the infrastructure equipment acting as relay nodes of the second communications path being a target parent node for the child node.

Paragraph 12. A method according to any of Paragraphs 9 to 11, wherein the MAC control element comprises an identifier which indicates whether the child node should communicate with the donor node over the second communications path instead of the first communications path or communicate with the donor node over both of the first communications path and the second communications path.

Paragraph 13. A method according to any of Paragraphs 9 to 12, wherein the MAC control element comprises an indication of why the triggering infrastructure equipment determined that the trigger condition was satisfied.

Paragraph 14. A method according to any of Paragraphs 1 to 13, wherein the route change command is transmitted by the triggering infrastructure equipment using physical layer signaling.

Paragraph 15. A method according to any of Paragraphs 1 to 14, wherein when the triggering infrastructure equipment is the child node and the route change command is transmitted to the one of the infrastructure equipment acting as relay nodes on the second communications path, the one of the infrastructure equipment acting on relay nodes of the second communications path is a target parent node for the child node.

Paragraph 16. A method according to any of Paragraphs 1 to 15, comprising
  determining, by the parent node, that the child node should enter a dual connection mode in which the child node communicates with the parent node via a first route and a second route, each of the first route and the second route comprising at least one intermediate infrastructure equipment, and
  transmitting, by the parent node, an indication to the child node that the child node should enter the dual connection mode.

Paragraph 17. A method according to Paragraph 16, comprising
  performing measurements on signals received from each of one or more infrastructure equipment with which the parent node is connected to via a backhaul communications link to measure a relative link quality between the parent node and the each of the one or more infrastructure equipment with which the parent node is connected to via a backhaul communications link,
  wherein the determining that the child node should enter a dual connection mode is based on determining that at least one of the measured link qualities is below a threshold link quality.

Paragraph 18. A method according to Paragraph 16 or Paragraph 17, comprising
  determining, by the child node, that there is a risk of a conflict between signals transmitted to the intermediate infrastructure equipment on the first route and signals transmitted to the intermediate infrastructure equipment on the second route, and
  transmitting, by the child node, the signals representing the data for the parent node to the intermediate infrastructure equipment on each of the first route and the second route separately and at different times.

Paragraph 19. A method according to any of Paragraphs 16 to 18, comprising
  determining, by the child node, that there is no risk of a conflict between signals transmitted to the intermediate infrastructure equipment on the first route and signals transmitted to the intermediate infrastructure equipment on the second route, and
  transmitting, by the child node, the signals representing the data for the parent node to the intermediate infrastructure equipment on each of the first route and the second route contemporaneously.

Paragraph 20. A method according to Paragraph 18 or Paragraph 19, wherein the signals representing the data transmitted by the child node to the intermediate infrastructure equipment on each of the first route and the second route comprise an indication whether one or more data packets previously transmitted by the child node should be discarded, wherein when the indication indicates that the data packets previously transmitted by the child node should be discarded, the method comprises
  determining, by the intermediate infrastructure equipment, that one or more of the data packets that should be discarded have a sequence number falling within a predetermined range, and
  adjusting, by the intermediate infrastructure equipment, a receiving window at the intermediate infrastructure equipment, the receiving window indicating a range of sequence numbers which are expected to be received, so that the receiving window no longer indicates the sequence numbers of the one or more data packets that should be discarded.

Paragraph 21. A method according to any of Paragraphs 16 to 20, comprising
  performing a selection combining procedure at the parent node on signals received from the child node via the intermediate infrastructure equipment on each of the first route and the second route, the selection combining procedure comprising, for each signal transmitted by the child node, selecting between the signals received via the intermediate infrastructure equipment on each of the first route and the second route dependent on which has a highest signal-to-noise ratio.

Paragraph 22. A method according to any of Paragraphs 16 to 21, comprising
  performing a Logarithmic Likelihood Ratio, LLR, combining procedure at the parent node on signals received from the child node via the intermediate infrastructure equipment on each of the first route and the second route, the LLR combining procedure comprising, for each signal transmitted by the child node, combining the signals received via the intermediate infrastructure equipment on each of the first route and the second route to produce a single combined signal.

Paragraph 23. A method according to any of Paragraphs 1 to 22, comprising
  transmitting signals representing data from a third infrastructure equipment to the donor node, the third infrastructure equipment being an end node configured to transmit signals to others of the infrastructure equipment via the backhaul link only on the uplink and/or to receive signals from others of the infrastructure equipment via the backhaul link only on the downlink, wherein the signals representing data may be transmitted from the end node to the donor node via one or more of a plurality of end-to-end routes, each of the end-to-end routes comprising one or more intermediate infrastructure equipment.

Paragraph 24. A method according to Paragraph 23, comprising
  transmitting, by the end node, duplicate data packets to the donor node via more than one of the end-to-end routes, and
  determining, by the donor node, which of the duplicate data packets should be retained and which of the duplicate data packets should be discarded.

Paragraph 25 A method according to Paragraph 23 or Paragraph 24, comprising
  transmitting, by the donor node, duplicate data packets to one of the communications devices via more than one of the end-to-end routes, and
  determining, by the one of the communications devices, which of the duplicate data packets should be retained and which of the duplicate data packets should be discarded.

Paragraph 26. A method according to any of Paragraphs 23 to 25, wherein the third infrastructure equipment is the second infrastructure equipment.

Paragraph 27. A method according to any of Paragraphs 23 to 26, wherein the third infrastructure equipment is different to the second infrastructure equipment.

Paragraph 28. A method according to any of Paragraphs 23 to 27, wherein each of the plurality of end-to-end routes is formed by a continuous end-to-end F1 user-plane interface connection which connects the donor node to the end node via the one or more intermediate infrastructure equipment.

Paragraph 29. A wireless communications network comprising a plurality of infrastructure equipment each being configured to communicate with one or more others of the infrastructure equipment via a backhaul communications link, one or more of the infrastructure equipment each being configured to communicate with one or more communications devices via an access link, wherein a second of the infrastructure equipment is configured
- to communicate, with a first of the infrastructure equipment acting as a donor node connected to a core network part of the wireless communications network, signals representing data by a second of the infrastructure equipment over a first communications path via one or more others of the infrastructure equipment acting as relay nodes, the second infrastructure equipment being a child node and one of the one or more other infrastructure equipment acting as the relay nodes or the donor node being a parent node, the parent node being connected to the child node via a backhaul communications link and configured to allocate uplink communications resources to the child node, and a triggering infrastructure equipment which is one of the child node and the parent node is configured
- to determine that a trigger condition for the child node to communicate with the donor node over a second communications path via one or more other of the infrastructure equipment acting as relay nodes is satisfied, the second communications path being different to the first communications path, and
- to transmit a route change command to the other of the child node and the parent node to the triggering infrastructure equipment or when the child node is the triggering infrastructure equipment, to transmit the route change command to one of the infrastructure equipment acting as relay nodes on the second communications path, the route change command indicating that the child node should communicate with the donor node over the second communications path, and the child node is configured
- to communicate with the donor node over the second communications path.

Paragraph 30. Circuitry for wireless communications network comprising a plurality of infrastructure equipment each being configured to communicate with one or more others of the infrastructure equipment via a backhaul communications link, one or more of the infrastructure equipment each being configured to communicate with one or more communications devices via an access link, wherein a second of the infrastructure equipment is configured
- to communicate, with a first of the infrastructure equipment acting as a donor node connected to a core network part of the wireless communications network, signals representing data by a second of the infrastructure equipment over a first communications path via one or more others of the infrastructure equipment acting as relay nodes, the second infrastructure equipment being a child node and one of the one or more other infrastructure equipment acting as the relay nodes or the donor node being a parent node, the parent node being connected to the child node via a backhaul communications link and configured to allocate uplink communications resources to the child node, and a triggering infrastructure equipment which is one of the child node and the parent node is configured
- to determine that a trigger condition for the child node to communicate with the donor node over a second communications path via one or more other of the infrastructure equipment acting as relay nodes is satisfied, the second communications path being different to the first communications path, and
- to transmit a route change command to the other of the child node and the parent node to the triggering infrastructure equipment or when the child node is the triggering infrastructure equipment, to transmit the route change command to one of the infrastructure equipment acting as relay nodes on the second communications path, the route change command indicating that the child node should communicate with the donor node over the second communications path, and the child node is configured
- to communicate with the donor node over the second communications path.

Paragraph 31. A method of operating a second infrastructure equipment forming part of a wireless communications network comprising a plurality of other infrastructure equipment, the second infrastructure equipment and the plurality of other infrastructure equipment each being configured to communicate with one or more others of the infrastructure equipment via a backhaul communications link, one or more of the infrastructure equipment each being configured to communicate with one or more communications devices via an access link, the method comprising
- communicating, with a first of the infrastructure equipment acting as a donor node connected to a core network part of the wireless communications network, signals representing data by the second infrastructure equipment over a first communications path via one or more others of the infrastructure equipment acting as relay nodes, the second infrastructure equipment being a child node and one of the one or more other infrastructure equipment acting as the relay nodes or the donor node being a parent node, the child node being connected to the parent node via a backhaul communications link and configured to receive uplink communications resources allocations from the parent node,
- determining that a trigger condition for the child node to communicate with the donor node over a second communications path via one or more other of the infrastructure equipment acting as relay nodes is satisfied, the second communications path being different to the first communications path,
- transmitting a route change command to the parent node or to one of the infrastructure equipment acting as relay nodes on the second communications path, the route change command indicating that the child node should communicate with the donor node over the second communications path, and
- communicating with the donor node over the second communications path.

Paragraph 32. A second infrastructure equipment forming part of a wireless communications network comprising a plurality of other infrastructure equipment, the second infrastructure equipment and the plurality of other infrastructure equipment each being configured to communicate with one or more others of the infrastructure equipment via a backhaul communications link, one or more of the infrastructure equipment each being configured to communicate with one or more communications devices via an access link, wherein the second infrastructure comprises transceiver circuitry and controller circuitry which are configured in combination to communicate, with a first of the infrastructure equipment acting as a donor node connected to a core network part of the wireless communications network, signals representing data by the second infrastructure equipment over a first communications path via one or more others of the infrastructure equipment acting as relay nodes, the second infrastructure equipment being a child node and one of the one or more other infrastructure equipment acting as the relay nodes or the donor node being a parent node, the child node being connected to the parent node via a backhaul communications link and configured to receive uplink communications resources allocations from the parent node, to determine that a trigger condition for the child node to communicate with the donor node over a second communications path via one or more other of the infrastructure equipment acting as relay nodes is satisfied, the second communications path being different to the first communications path, to transmit a route change command to the parent node or to one of the infrastructure equipment acting as relay nodes on the second communications path, the route change command indicating that the child node should communicate with the donor node over the second communications path, and to communicate with the donor node over the second communications path.

Paragraph 33. Circuitry for a second infrastructure equipment forming part of a wireless communications network comprising a plurality of other infrastructure equipment, the second infrastructure equipment and the plurality of other infrastructure equipment each being configured to communicate with one or more others of the infrastructure equipment via a backhaul communications link, one or more of the infrastructure equipment each being configured to communicate with one or more communications devices via an access link, wherein the second infrastructure comprises transceiver circuitry and controller circuitry which are configured in combination to communicate, with a first of the infrastructure equipment acting as a donor node connected to a core network part of the wireless communications network, signals representing data by the second infrastructure equipment over a first communications path via one or more others of the infrastructure equipment acting as relay nodes, the second infrastructure equipment being a child node and one of the one or more other infrastructure equipment acting as the relay nodes or the donor node being a parent node, the child node being connected to the parent node via a backhaul communications link and configured to receive uplink communications resources allocations from the parent node, to determine that a trigger condition for the child node to communicate with the donor node over a second communications path via one or more other of the infrastructure equipment acting as relay nodes is satisfied, the second communications path being different to the first communications path, to transmit a route change command to the parent node or to one of the infrastructure equipment acting as relay nodes on the second communications path, the route change command indicating that the child node should communicate with the donor node over the second communications path, and to communicate with the donor node over the second communications path.

Paragraph 34. A method of operating an infrastructure equipment acting as a relay node forming part of a wireless communications network comprising a plurality of other infrastructure equipment, the infrastructure equipment acting as the relay node and the plurality of other infrastructure equipment each being configured to communicate with one or more others of the infrastructure equipment via a backhaul communications link, one or more of the infrastructure equipment each being configured to communicate with one or more communications devices via an access link, the method comprising relaying signals representing data between a second of the infrastructure equipment to a first of the infrastructure equipment, the first infrastructure equipment acting as a donor node connected to a core network part of the wireless communications network, the signals being relayed over a first communications path via at least the infrastructure equipment acting as the relay node, the second infrastructure equipment being a child node and the infrastructure equipment acting as the relay node or the donor node being a parent node, the parent node being connected to the child node via a backhaul communications link and configured to allocate uplink communications resources to the child node, determining that a trigger condition for the child node to communicate with the donor node over a second communications path via one or more other of the infrastructure equipment acting as relay nodes is satisfied, the second communications path being different to the first communications path, and transmitting a route change command to the child node, the route change command indicating that the child node should communicate with the donor node over the second communications path.

Paragraph 35. An infrastructure equipment acting as a relay node forming part of a wireless communications network comprising a plurality of other infrastructure equipment, the infrastructure equipment acting as the relay node and the plurality of other infrastructure equipment each being configured to communicate with one or more others of the infrastructure equipment via a backhaul communications link, one or more of the infrastructure equipment each being configured to communicate with one or more communications devices via an access link, the infrastructure equipment acting as the relay node comprising controller circuitry and transceiver circuitry which are configured in combination to relay signals representing data between a second of the infrastructure equipment to a first of the infrastructure equipment, the first infrastructure equipment acting as a donor node connected to a core network part of the wireless communications network, the signals being relayed over a first communications path via at least the infrastructure equipment acting as the relay node, the second infrastructure equipment being a child node and the infrastructure equipment acting as the relay node or the donor node being a parent node, the parent node being connected to the child node via a backhaul communications link and configured to allocate uplink communications resources to the child node, to determine that a trigger condition for the child node to communicate with the donor node over a second communications path via one or more other of the infrastructure equipment acting as relay nodes is satisfied, the second communications path being different to the first communications path, and to transmit a route change command to the child node, the route change command indicating that the child node should communicate with the donor node over the second communications path.

Paragraph 36. Circuitry for an infrastructure equipment acting as a relay node forming part of a wireless communications network comprising a plurality of other infrastructure equipment, the infrastructure equipment acting as the relay node and the plurality of other infrastructure equipment each being configured to communicate with one or more others of the infrastructure equipment via a backhaul communications link, one or more of the infrastructure equipment each being configured to communicate with one or more communications devices via an access link, the infrastructure equipment acting as the relay node comprising controller circuitry and transceiver circuitry which are configured in combination to relay signals representing data between a second of the infrastructure equipment to a first of the infrastructure equipment, the first infrastructure equipment acting as a donor node connected to a core network part of the wireless communications network, the signals being relayed over a first communications path via at least the infrastructure equipment acting as the relay node, the second infrastructure equipment being a child node and the infrastructure equipment acting as the relay node or the donor node being a parent node, the parent node being connected to the child node via a backhaul communications link and configured to allocate uplink communications resources to the child node, to determine that a trigger condition for the child node to communicate with the donor node over a second communications path via one or more other of the infrastructure equipment acting as relay nodes is satisfied, the second communications path being different to the first communications path, and to transmit a route change command to the child node, the route change command indicating that the child node should communicate with the donor node over the second communications path.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognize that various features of the described embodiments may be combined in any manner suitable to implement the technique.

REFERENCES

[1] Holma H. and Toskala A, "LTE for UMTS OFDMA and SC-FDMA based radio access", John Wiley and Sons, 2009.
[2] RP-161901, "Revised work item proposal: Enhancements of NB-IoT", Huawei, HiSilicon, 3GPP TSG RAN Meeting #73, New Orleans, USA, Sep. 19-22, 2016.
[3] RP-170831, "New SID Proposal: Study on Integrated Access and Backhaul for NR", AT&T, 3GPP RAN Meeting #75, Dubrovnik, Croatia, March 2017.
[4] 3GPP TTR 38.874 "$3^{rd}$ Generation Partnership Project; Technical Specification Group Radio Access Network; Study on Integrated Access and Backhaul; (Release 15)", $3^{rd}$ Generation Partnership Project, February 2018.
[5] R2-1801606, "Proposals on IAB Architecture", Qualcomm et al, 3GPP TSG-RAN WG2 NR Ad hoc 1801, Vancouver, Canada, Jan. 22-26, 2018.
[6] R3-181502, "Way Forward—IAB Architecture for L2/3 relaying", Qualcomm et al, 3GPP TSG-RAN WG3 Meeting #99, Athens, Greece, Feb. 26-Mar. 2, 2018.

What is claimed is:

1. A method of controlling communications within a wireless communications network comprising a plurality of infrastructure equipment each being configured to communicate with one or more others of the infrastructure equipment via a backhaul communications link, one or more of the infrastructure equipment each being configured to communicate with one or more communications devices via an access link, the method comprising:

communicating, with a first of the infrastructure equipment acting as a donor node connected to a core network part of the wireless communications network, signals representing data by a second of the infrastructure equipment over a first communications path via one or more others of the infrastructure equipment acting as relay nodes, the second infrastructure equipment being a child node and one of the one or more other infrastructure equipment acting as the relay nodes or the donor node being a parent node, the parent node being connected to the child node via a backhaul communications link and configured to allocate uplink communications resources to the child node, determining, by a triggering infrastructure equipment which is one of the child node and the parent node, that a trigger condition for the child node to communicate with the donor node over a second communications path via one or more other of the infrastructure equipment acting as relay nodes is satisfied, the second communications path being different to the first communications path, transmitting a route change command to the other of the child node and the parent node, to the triggering infrastructure equipment or when the child node is the triggering infrastructure equipment, transmitting the route change command to one of the infrastructure equipment acting as relay nodes on the second communications path, the route change command indicating that the child node should communicate with the donor node over the second communications path, and communicating, by the child node, with the donor node over the second communications path, wherein the determining that the trigger condition is satisfied comprises at least a determination that at least one quality of service requirement cannot be guaranteed by the parent node.

2. The method according to claim 1, wherein the determining that the trigger condition is satisfied further comprises a determination, based on measurements performed by the triggering infrastructure equipment on received reference symbols, that a link quality between two of the infrastructure equipment on the first communications path is below a threshold link quality.

3. The method according to claim 2, wherein the two of the infrastructure equipment are the child node and the parent node.

4. The method according to claim 1, wherein the determining that the trigger condition is satisfied further comprises a determination that a load at the parent node is above a threshold load.

5. The method according to claim 1, wherein when the triggering infrastructure equipment is the child node, the determination is made by the child node based on the reception of one of a broadcast from the parent node and a dedicated transmission from the parent node to the child node.

6. The method according to claim 1, wherein the determining that the trigger condition is satisfied further comprises a determination that the child node has more data to transmit to the parent node than can be transmitted in communications resources allocated to the child node for transmitting signals to the parent node.

7. The method according to claim 6, wherein when the triggering infrastructure equipment is the parent node, the determination is made by the parent node based on a buffer status report received from the child node.

8. The method according to claim 1, wherein the route change command is transmitted by the triggering infrastructure equipment in a Medium Access Control (MAC) control element.

9. The method according to claim 8, wherein the MAC control element is specific to and associated only with the transmission of the route change command.

10. The method according to claim 8, wherein the MAC control element comprises an indication of a cell identifier associated with one of the infrastructure equipment acting as relay nodes of the second communications path, the one of the infrastructure equipment acting as relay nodes of the second communications path being a target parent node for the child node.

11. The method according to claim 8, wherein the MAC control element comprises an identifier which indicates whether the child node should communicate with the donor node over the second communications path instead of the first communications path or communicate with the donor node over both of the first communications path and the second communications path.

12. The method according to claim 8, wherein the MAC control element comprises an indication of why the triggering infrastructure equipment determined that the trigger condition was satisfied.

13. The method according to claim 1, wherein the route change command is transmitted by the triggering infrastructure equipment using physical layer signalling.

14. The method according to claim 1, wherein when the triggering infrastructure equipment is the child node and the route change command is transmitted to the one of the infrastructure equipment acting as relay nodes on the second communications path, the one of the infrastructure equipment acting on relay nodes of the second communications path is a target parent node for the child node.

15. The method according to claim 1, comprising:
determining, by the parent node, that the child node should enter a dual connection mode in which the child node communicates with the parent node via a first route and a second route, each of the first route and the second route comprising at least one intermediate infrastructure equipment, and
transmitting, by the parent node, an indication to the child node that the child node should enter the dual connection mode.

16. The method according to claim 15, comprising:
performing measurements on signals received from each of one or more infrastructure equipment with which the parent node is connected to via a backhaul communications link to measure a relative link quality between the parent node and the each of the one or more infrastructure equipment with which the parent node is connected to via a backhaul communications link,
wherein the determining that the child node should enter a dual connection mode is based on determining that at least one of the measured link qualities is below a threshold link quality.

17. The method according to claim 15, comprising:
determining, by the child node, that there is a risk of a conflict between signals transmitted to the intermediate infrastructure equipment on the first route and signals transmitted to the intermediate infrastructure equipment on the second route, and
transmitting, by the child node, the signals representing the data for the parent node to the intermediate infrastructure equipment on each of the first route and the second route separately and at different times.

18. A method of operating a second infrastructure equipment forming part of a wireless communications network comprising a plurality of other infrastructure equipment, the second infrastructure equipment and the plurality of other infrastructure equipment each being configured to communicate with one or more others of the infrastructure equipment via a backhaul communications link, one or more of the infrastructure equipment each being configured to communicate with one or more communications devices via an access link, the method comprising:
communicating, with a first of the infrastructure equipment acting as a donor node connected to a core network part of the wireless communications network, signals representing data by the second infrastructure equipment over a first communications path via one or more others of the infrastructure equipment acting as relay nodes, the second infrastructure equipment being a child node and one of the one or more other infrastructure equipment acting as the relay nodes or the donor node being a parent node, the child node being connected to the parent node via a backhaul communications link and configured to receive uplink communications resources allocations from the parent node,
determining that a trigger condition for the child node to communicate with the donor node over a second communications path via one or more other of the infrastructure equipment acting as relay nodes is satisfied, the second communications path being different to the first communications path,
transmitting a route change command to the parent node or to one of the infrastructure equipment acting as relay nodes on the second communications path, the route change command indicating that the child node should communicate with the donor node over the second communications path, and communicating with the donor node over the second communications path, wherein the determining that the trigger condition is satisfied comprises at least a determination that at least one quality of service requirement cannot be guaranteed b the parent node.

19. A method of operating an infrastructure equipment acting as a relay node forming part of a wireless communications network comprising a plurality of other infrastructure equipment, the infrastructure equipment acting as the relay node and the plurality of other infrastructure equipment each being configured to communicate with one or more others of the infrastructure equipment via a backhaul communications link, one or more of the infrastructure equipment each being configured to communicate with one or more communications devices via an access link, the method comprising:

relaying signals representing data between a second of the infrastructure equipment to a first of the infrastructure equipment, the first infrastructure equipment acting as a donor node connected to a core network part of the wireless communications network, the signals being relayed over a first communications path via at least the infrastructure equipment acting as the relay node, the second infrastructure equipment being a child node and the infrastructure equipment acting as the relay node or the donor node being a parent node, the parent node being connected to the child node via a backhaul communications link and configured to allocate uplink communications resources to the child node, determining that a trigger condition for the child node to communicate with the donor node over a second communications path via one or more other of the infrastructure equipment acting as relay nodes is satisfied, the second communications path being different to the first communications path, and transmitting a route change command to the child node, the route change command indicating that the child node should communicate with the donor node over the second communications path, wherein the determining that the trigger condition is satisfied comprises at least a determination that at least one quality of service requirement cannot be guaranteed by the parent node.

* * * * *